US008842092B2

(12) United States Patent
Sakamoto

(10) Patent No.: US 8,842,092 B2
(45) Date of Patent: Sep. 23, 2014

(54) METHOD OF DETECTING CONTACT STATE OF RESISTIVE TOUCH PANEL DEVICE, TOUCH PANEL DEVICE, AND DISPLAY DEVICE

(75) Inventor: Masanori Sakamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 819 days.

(21) Appl. No.: 13/094,042

(22) Filed: Apr. 26, 2011

(65) Prior Publication Data
US 2011/0261011 A1     Oct. 27, 2011

(30) Foreign Application Priority Data

Apr. 27, 2010 (JP) .................................. 2010-102611
Feb. 25, 2011 (JP) .................................. 2011-039878

(51) Int. Cl.
G06F 3/045 (2006.01)
G06F 3/041 (2006.01)
G06K 11/06 (2006.01)

(52) U.S. Cl.
CPC ...... G06F 3/045 (2013.01); G06F 2203/04104 (2013.01)
USPC .......................... 345/174; 345/173; 178/18.01

(58) Field of Classification Search
USPC .................. 345/173–179; 178/18.01–18.09
See application file for complete search history.

(56) References Cited

U.S. PATENT DOCUMENTS

| 7,023,427 B2 * | 4/2006 | Kraus et al. ................... 345/173 |
| 2009/0322701 A1 * | 12/2009 | D'Souza et al. ............... 345/174 |
| 2010/0149122 A1 * | 6/2010 | Lin .............................. 345/173 |

FOREIGN PATENT DOCUMENTS

| JP | 06-095791 A | 4/1994 |
| JP | 08-241161 A | 9/1996 |
| JP | 09-160709 A | 6/1997 |
| JP | 2008-310500 A | 12/2008 |
| JP | 2009-176114 A | 8/2009 |

* cited by examiner

Primary Examiner — Vijay Shankar
Assistant Examiner — Amit Chatly
(74) Attorney, Agent, or Firm — Holtz Holtz Goodman & Chick PC

(57) ABSTRACT

A method of detecting a contact state of resistive touch panel device includes measuring a potential at both ends of a first resistive film, as viewed in a first direction, as a first-film-potential. At this time, the both ends of the first resistive film are short circuited, and a predetermined current is applied between both ends of a second resistive film, as viewed in a second direction. The method further includes measuring a potential at the both ends of the second resistive film as a second-film-potential. At this time, the both ends of the second resistive film are short circuited, and the current is applied between the both ends of the first resistive film. The method further includes deriving distance information between two contact points of the first and the second resistive film, based on the first-film-potential and the second-film-potential.

14 Claims, 18 Drawing Sheets

|    | X1  | X2  | X3  | X4  | X5  | X6  |
|----|-----|-----|-----|-----|-----|-----|
| Y1 | 0.4 | 1.2 | 2.1 | 2.9 | 3.7 | 4.6 |
| Y2 | 0.4 | 1.2 | 2.1 | 2.9 | 3.7 | 4.6 |
| Y3 | 0.4 | 1.2 | 2.1 | 2.9 | 3.7 | 4.6 |
| Y4 | 0.4 | 1.2 | 2.1 | 2.9 | 3.7 | 4.6 |
| Y5 | 0.4 | 1.2 | 2.1 | 2.9 | 3.7 | 4.6 |
| Y6 | 0.4 | 1.2 | 2.1 | 2.9 | 3.7 | 4.6 |
| Y7 | 0.4 | 1.2 | 2.1 | 2.9 | 3.7 | 4.6 |
| Y8 | 0.4 | 1.2 | 2.1 | 2.9 | 3.7 | 4.6 |

|    | X1  | X2  | X3  | X4  | X5  | X6  |
|----|-----|-----|-----|-----|-----|-----|
| Y1 | 4.7 | 4.7 | 4.7 | 4.7 | 4.7 | 4.7 |
| Y2 | 4.1 | 4.1 | 4.1 | 4.1 | 4.1 | 4.1 |
| Y3 | 3.5 | 3.5 | 3.5 | 3.5 | 3.5 | 3.5 |
| Y4 | 2.8 | 2.8 | 2.8 | 2.8 | 2.8 | 2.8 |
| Y5 | 2.2 | 2.2 | 2.2 | 2.2 | 2.2 | 2.2 |
| Y6 | 1.6 | 1.6 | 1.6 | 1.6 | 1.6 | 1.6 |
| Y7 | 1.0 | 1.0 | 1.0 | 1.0 | 1.0 | 1.0 |
| Y8 | 0.4 | 0.4 | 0.4 | 0.4 | 0.4 | 0.4 |

|     | X1  | X2  | X3  | X4  | X5  | X6  |
|-----|-----|-----|-----|-----|-----|-----|
| Y1  | 0.0 | 0.1 | 0.1 | 0.2 | 0.2 | 0.3 |
| Y2  | 0.1 | 0.2 | 0.4 | 0.5 | 0.7 | 0.8 |
| Y3  | 0.1 | 0.3 | 0.6 | 0.8 | 1.0 | 1.2 |
| Y4  | 0.1 | 0.4 | 0.7 | 1.0 | 1.3 | 1.6 |
| Y5  | 0.2 | 0.5 | 0.9 | 1.2 | 1.5 | 1.8 |
| Y6  | 0.2 | 0.6 | 1.0 | 1.3 | 1.7 | 2.1 |
| Y7  | 0.2 | 0.6 | 1.0 | 1.4 | 1.9 | 2.3 |
| Y8  | 0.2 | 0.7 | 1.0 | 1.4 | 1.9 | 2.6 |

FIG.12

|    | X1 | X2  | X3  | X4  | X5  | X6  |
|----|----|-----|-----|-----|-----|-----|
| Y1 |    | 2.3 | 1.9 | 1.5 | 1.1 | 0.8 |
| Y2 |    | 2.1 | 1.8 | 1.5 | 1.3 | 1.0 |
| Y3 |    | 1.9 | 1.7 | 1.5 | 1.4 | 1.3 |
| Y4 |    | 1.6 | 1.5 |     | 1.5 | 1.6 |
| Y5 |    | 1.3 | 1.4 | 1.5 | 1.7 | 1.9 |
| Y6 |    | 1.0 | 1.3 | 1.5 | 1.8 | 2.1 |
| Y7 |    | 0.8 | 1.1 | 1.5 | 1.9 | 2.3 |
| Y8 |    |     |     |     |     |     |

FIG.13

|    | X1 | X2 | X3 | X4 | X5 | X6 |
|----|----|----|----|----|----|----|
| Y1 |    | ○  | ○  | ○  | ×  | ×  |
| Y2 |    | ○  | ○  | ○  | ×  | ×  |
| Y3 |    | ○  | ○  | ○  | ×  | ×  |
| Y4 |    | ○  | ○  |    | ○  | ○  |
| Y5 |    | ×  | ×  | ○  | ○  | ○  |
| Y6 |    | ×  | ×  | ○  | ○  | ○  |
| Y7 |    | ×  | ×  | ○  | ○  | ○  |
| Y8 |    |    |    |    |    |    |

| | X1 | X2 | X3 | X4 | X5 | X6 |
|---|---|---|---|---|---|---|
| Y1 | 0.2 | 0.6 | 1.0 | 1.4 | 1.9 | 2.6 |
| Y2 | 0.2 | 0.6 | 1.0 | 1.4 | 1.9 | 2.3 |
| Y3 | 0.2 | 0.6 | 1.0 | 1.3 | 1.7 | 2.1 |
| Y4 | 0.2 | 0.5 | 0.9 | 1.2 | 1.5 | 1.9 |
| Y5 | 0.1 | 0.4 | 0.7 | 1.0 | 1.3 | 1.6 |
| Y6 | 0.1 | 0.4 | 0.6 | 0.8 | 1.1 | 1.3 |
| Y7 | 0.1 | 0.2 | 0.4 | 0.5 | 0.7 | 0.9 |
| Y8 | 0.0 | 0.1 | 0.1 | 0.2 | 0.3 | 0.4 |

FIG.16

|    | X1 | X2  | X3  | X4  | X5  | X6  |
|----|----|-----|-----|-----|-----|-----|
| Y1 |    | 1.1 | 1.4 | 1.7 | 2.1 | 2.5 |
| Y2 |    | 1.3 | 1.5 | 1.7 | 2.0 | 2.2 |
| Y3 |    | 1.5 | 1.6 | 1.7 | 1.9 | 2.1 |
| Y4 |    | 1.8 | 1.7 |     | 1.7 | 1.8 |
| Y5 |    | 2.1 | 1.9 | 1.7 | 1.6 | 1.5 |
| Y6 |    | 2.2 | 2.0 | 1.7 | 1.5 | 1.3 |
| Y7 |    | 2.5 | 2.1 | 1.7 | 1.4 | 1.1 |
| Y8 |    |     |     |     |     |     |

FIG.17

|    | X1 | X2 | X3 | X4 | X5 | X6 |
|----|----|----|----|----|----|----|
| Y1 |    | ×  | ×  | ×  | ○  | ○  |
| Y2 |    | ×  | ×  | ×  | ○  | ○  |
| Y3 |    | ×  | ×  | ×  | ○  | ○  |
| Y4 |    | ×  | ×  |    | ×  | ×  |
| Y5 |    | ○  | ○  | ×  | ×  | ×  |
| Y6 |    | ○  | ○  | ×  | ×  | ×  |
| Y7 |    | ○  | ○  | ×  | ×  | ×  |
| Y8 |    |    |    |    |    |    |

|    | X1 | X2  | X3  | X4  | X5  | X6  |
|----|----|-----|-----|-----|-----|-----|
| Y1 |    | 1.9 | 2.4 | 2.5 | 2.5 | 2.0 |
| Y2 |    | 1.9 | 2.4 | 2.6 | 2.5 | 2.0 |
| Y3 |    | 1.9 | 2.4 | 2.6 | 2.5 | 2.0 |
| Y4 |    | 1.9 | 2.4 | 2.7 | 2.4 | 1.9 |
| Y5 |    | 2.0 | 2.5 | 2.6 | 2.4 | 1.9 |
| Y6 |    | 2.0 | 2.5 | 2.6 | 2.4 | 1.9 |
| Y7 |    | 2.0 | 2.5 | 2.5 | 2.4 | 1.9 |
| Y8 |    |     |     |     |     |     |

|    | X1 | X2  | X3  | X4  | X5  | X6  |
|----|----|-----|-----|-----|-----|-----|
| Y1 |    | 2.9 | 2.9 | 2.9 | 3.0 | 3.0 |
| Y2 |    | 3.4 | 3.4 | 3.4 | 3.4 | 3.4 |
| Y3 |    | 3.6 | 3.6 | 3.8 | 3.6 | 3.6 |
| Y4 |    | 4.0 | 4.0 | 4.2 | 4.0 | 4.0 |
| Y5 |    | 3.6 | 3.6 | 3.8 | 3.6 | 3.6 |
| Y6 |    | 3.4 | 3.4 | 3.4 | 3.4 | 3.4 |
| Y7 |    | 3.0 | 3.0 | 2.9 | 2.9 | 2.9 |
| Y8 |    |     |     |     |     |     |

FIG.27

|    | X1 | X2  | X3  | X4   | X5  | X6  |
|----|----|-----|-----|------|-----|-----|
| Y1 |    | 0.0 | 6.3 | 7.5  | 7.5 | 1.3 |
| Y2 |    | 0.0 | 6.3 | 8.8  | 7.5 | 1.3 |
| Y3 |    | 0.0 | 6.3 | 8.8  | 7.5 | 1.3 |
| Y4 |    | 0.0 | 6.3 | 10.0 | 6.3 | 0.0 |
| Y5 |    | 1.3 | 7.5 | 8.8  | 6.3 | 0.0 |
| Y6 |    | 1.3 | 7.5 | 8.8  | 6.3 | 0.0 |
| Y7 |    | 1.3 | 7.5 | 7.5  | 6.3 | 0.0 |
| Y8 |    |     |     |      |     |     |

FIG.28

|    | X1 | X2  | X3  | X4   | X5  | X6  |
|----|----|-----|-----|------|-----|-----|
| Y1 |    | 0.0 | 0.0 | 0.0  | 0.8 | 0.8 |
| Y2 |    | 3.8 | 3.8 | 3.8  | 3.8 | 3.8 |
| Y3 |    | 5.4 | 5.4 | 6.9  | 5.4 | 5.4 |
| Y4 |    | 8.5 | 8.5 | 10.0 | 8.5 | 8.5 |
| Y5 |    | 5.4 | 5.4 | 6.9  | 5.4 | 5.4 |
| Y6 |    | 3.8 | 3.8 | 3.8  | 3.8 | 3.8 |
| Y7 |    | 0.8 | 0.8 | 0.0  | 0.0 | 0.0 |
| Y8 |    |     |     |      |     |     |

FIG.29

|    | X1 | X2  | X3   | X4   | X5   | X6  |
|----|----|-----|------|------|------|-----|
| Y1 |    | 0.0 | 6.3  | 7.5  | 7.5  | 1.5 |
| Y2 |    | 3.8 | 7.3  | 9.5  | 8.4  | 4.0 |
| Y3 |    | 5.4 | 8.3  | 11.1 | 9.2  | 5.5 |
| Y4 |    | 8.5 | 10.6 | 14.1 | 10.6 | 8.5 |
| Y5 |    | 5.5 | 9.2  | 11.1 | 8.3  | 5.4 |
| Y6 |    | 4.0 | 8.4  | 9.5  | 7.3  | 3.8 |
| Y7 |    | 1.5 | 7.5  | 7.5  | 6.3  | 0.0 |
| Y8 |    |     |      |      |      |     |

METHOD OF DETECTING CONTACT STATE OF RESISTIVE TOUCH PANEL DEVICE, TOUCH PANEL DEVICE, AND DISPLAY DEVICE

CROSS-REFERENCE TO RELATED APPLICATIONS

This application is based upon and claims the benefit of priority from prior Japanese Patent Applications No. 2010-102611, filed Apr. 27, 2010; and No. 2011-039878, filed Feb. 25, 2011, the entire contents of both of which are incorporated herein by reference.

BACKGROUND OF THE INVENTION

1. Field of the Invention

The present invention relates to a method for detecting a contact state of a resistive touch panel device, a resistive touch panel device, and a display device, and more particularly to a method for detecting a contact state of a resistive touch panel device, a resistive touch panel device and a display device capable of detecting a distance between two points pressed simultaneously.

2. Description of the Related Art

A resistive touch panel device has a configuration in which a resistive film to be pressed and a resistive film opposite thereto are provided on surfaces facing each other of a substrate to be pressed and a substrate opposite thereto, respectively, such that the substrates are arranged opposite to each other at intervals. When the substrate to be pressed is touched from the surface opposite to the surface on which the resistive film to be pressed is formed and thereby bent, the resistive film to be pressed and the opposite resistive film will be locally made into contact, and the resistive film to be pressed and the opposite resistive film will be brought into electrical conduction at a contact point therebetween. In such a resistive touch panel device, a driving circuit alternately applies a voltage to between both ends of the resistive film to be pressed and both ends of the opposite resistive film, and detects the position of the contact point as a touched position.

The above-described type of resistive touch panel device derives the contact point through arithmetic processing based on the premise that the number of touched portions (press portions) is one. Accordingly, when more than one point is pressed simultaneously, the above-described pair of the resistive films will be brought into conduction at more than one contact point, and thereby false detection will be made that a midpoint therebetween has been pressed. For example, Jpn. Pat. Appln. KOKAI Publication No. 8-241161 discloses a technique of determining that more than one point has been pressed based on a phenomenon that a resistance between the both ends of the above-described resistive film to be pressed will decrease when more than one point is pressed.

A touch panel device disclosed in Jpn. Pat. Appln. KOKAI Publication No. 8-241161 determines that a plurality of points have been pressed for the purpose of preventing error detection. On the other hand, as an input method of providing a variety of operations, a touch panel device has been desired that acquires information that more than one point has been simultaneously pressed as being significant. It is particularly meaningful to detect information on a distance between two points when the two points have been simultaneously pressed.

BRIEF SUMMARY OF THE INVENTION

It is therefore an object of the present invention to provide a method of detecting a contact state, a resistive touch panel device, and a display device, capable of detecting information on a distance between two points of a predetermined region or information on a change in the distance between the two points when the two points have been simultaneously pressed.

According to one aspect of the invention, a method of detecting a contact state of a resistive touch panel device includes measuring, in a state in which (i) both ends of a first resistive film, as viewed in a first direction, are short circuited and (ii) a predetermined current is applied between both ends of a second resistive film, as viewed in a second direction, a potential at the both ends of the first resistive film as a first-film-potential; measuring, in a state in which (i) the both ends of the second resistive film are short circuited and (ii) the current is applied between the both ends of the first resistive film, a potential at the both ends of the second resistive film as a second-film-potential; and deriving distance information between two points when the first resistive film contacts the second resistive film at the two points, based on the first-film-potential and the second-film-potential.

According to another aspect of the invention, a method of detecting a contact state of a resistive touch panel device includes measuring, in a first state in which (i) a predetermined voltage is applied between a first end region and a second end region and (ii) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end region being an end region of the second resistive film opposite to the third end region; measuring, in a second state in which (i) the voltage is applied between the third end region and the fourth end region and (ii) the first end region is made open, a potential at the second end region as a second potential; measuring, in a third state in which (i) the first end region and the fourth end region are short-circuited and (ii) the voltage is applied between the first end region and the second end region, a potential at the third end region as a third potential; measuring, in a fourth state in which (i) the first end region and the third end region are short-circuited and (ii) the voltage is applied between the first end region and the second end region, a potential at the fourth end region as a fourth potential; measuring, in a fifth state in which (i) the first end region and the second end region are short-circuited and (ii) a predetermined current is applied between the third end region and the fourth end region, a potential at the first end region and the second end region as a fifth potential; measuring, in a sixth state in which (i) the third end region and the fourth end region are short-circuited and (ii) the current is applied between the first end region and the second end region, a potential at the third end region and the fourth end region as a sixth potential; and deriving distance information between two points when the first resistive film contacts the second resistive film at the two points, based on the first potential, the second potential, the third potential, the fourth potential, the fifth potential and the sixth potential.

According to one aspect of the invention, a resistive touch panel device includes a touch panel including (i) a first resistive film, and (ii) a second resistive film which faces the first resistive film; and a driving circuit configured to perform measuring, in a state in which (a) both ends of a first resistive film, as viewed in a first direction, are short circuited and (b) a predetermined current is applied between both ends of a second resistive film, as viewed in a second direction, a potential at the both ends of the first resistive film as a first-filmpotential, (ii) measuring, in a state in which (a) the both ends of the second resistive film are short circuited and (b) the current is applied between the both ends of the first resistive film, a potential at the both ends of the second resistive film as a second-film-potential, and (iii) deriving distance information between two points when the first resistive film contacts the second resistive film at the two points, based on the first-film-potential and the second-film-potential.

According to another aspect of the invention, a resistive touch panel device includes a touch panel including (i) a first resistive film, and (ii) a second resistive film which faces the first resistive film; and a driving circuit configured to perform (i) measuring, in a first state in which (a) a predetermined voltage is applied between a first end region and a second end region and (b) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end region being an end region of the second resistive film opposite to the third end region, (ii) measuring, in a second state in which (a) the voltage is applied between the third end region and the fourth end region and (b) the first end region is made open, a potential at the second end region as a second potential, (iii) measuring, in a third state in which (a) the first end region and the fourth end region are short-circuited and (b) the voltage is applied between the first end region and the second end region, a potential at the third end region as a third potential, (iv) measuring, in a fourth state in which (a) the first end region and the third end region are short-circuited and (b) the voltage is applied between the first end region and the second end region, a potential at the fourth end region as a fourth potential, (v) measuring, in a fifth state in which (a) the first end region and the second end region are short-circuited and (b) a predetermined current is applied between the third end region and the fourth end region, a potential at the first end region and the second end region as a fifth potential, (vi) measuring, in a sixth state in which (a) the third end region and the fourth end region are short-circuited and (b) the current is applied between the first end region and the second end region, a potential at the third end region and the fourth end region as a sixth potential, and (vii) deriving distance information between two points when the first resistive film contacts the second resistive film at the two points, based on the first potential, the second potential, the third potential, the fourth potential, the fifth potential and the sixth potential.

According to one aspect of the invention, a display device includes a display panel which displays an image; a touch panel including (i) a first resistive film, and (ii) a second resistive film which faces the first resistive film; and a driving circuit configured to perform measuring, in a state in which (a) both ends of a first resistive film, as viewed in a first direction, are short circuited and (b) a predetermined current is applied between both ends of a second resistive film, as viewed in a second direction, a potential at the both ends of the first resistive film as a first-film-potential, (ii) measuring, in a state in which (a) the both ends of the second resistive film are short circuited and (b) the current is applied between the both ends of the first resistive film, a potential at the both ends of the second resistive film as a second-film-potential, and (iii) deriving distance information between two points when the first resistive film contacts the second resistive film at the two points, based on the first-film-potential and the second-film-potential.

According to another aspect of the invention, a display device includes a display panel which displays an image; a touch panel including (i) a first resistive film, and (ii) a second resistive film which faces the first resistive film; and a driving circuit configured to perform (i) measuring, in a first state in which (a) a predetermined voltage is applied between a first end region and a second end region and (b) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end region being an end region of the second resistive film opposite to the third end region, (ii) measuring, in a second state in which (a) the voltage is applied between the third end region and the fourth end region and (b) the first end region is made open, a potential at the second end region as a second potential, (iii) measuring, in a third state in which (a) the first end region and the fourth end region are short-circuited and (b) the voltage is applied between the first end region and the second end region, a potential at the third end region as a third potential, (iv) measuring, in a fourth state in which (a) the first end region and the third end region are short-circuited and (b) the voltage is applied between the first end region and the second end region, a potential at the fourth end region as a fourth potential, (v) measuring, in a fifth state in which (a) the first end region and the second end region are short-circuited and (b) a predetermined current is applied between the third end region and the fourth end region, a potential at the first end region and the second end region as a fifth potential, (vi) measuring, in a sixth state in which (a) the third end region and the fourth end region are short-circuited and (b) the current is applied between the first end region and the second end region, a potential at the third end region and the fourth end region as a sixth potential, and (vii) deriving distance information between two points when the first resistive film contacts the second resistive film at the two points, based on the first potential, the second potential, the third potential, the fourth potential, the fifth potential and the sixth potential.

According to the present invention, it is possible to detect information on a distance between two points within a predetermined region or information on a change in the distance between the two points when the two points have been simultaneously pressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 illustrates an example of potentials that are detected when two points have been touched in the third state;

FIG. 13 illustrates determination of the difference between the detected potential and the value of the YU ground table;

FIG. 16 illustrates potentials that are detected when two points have been touched in the fourth state;

FIG. 17 illustrates determination of differences between the detected potential and the value of the YD ground table;

FIG. 27 illustrates an example of corrected potentials that are detected when two points have been touched in the fifth state;

FIG. 28 illustrates an example of corrected potentials that are detected when two points have been touched in the sixth state; and FIG. 29 illustrates an example of values indicating a distance between two points.

DETAILED DESCRIPTION OF THE INVENTION

[First Embodiment]

A first embodiment of the present invention will be described below, with reference to the accompanying drawings.

Figure 1:
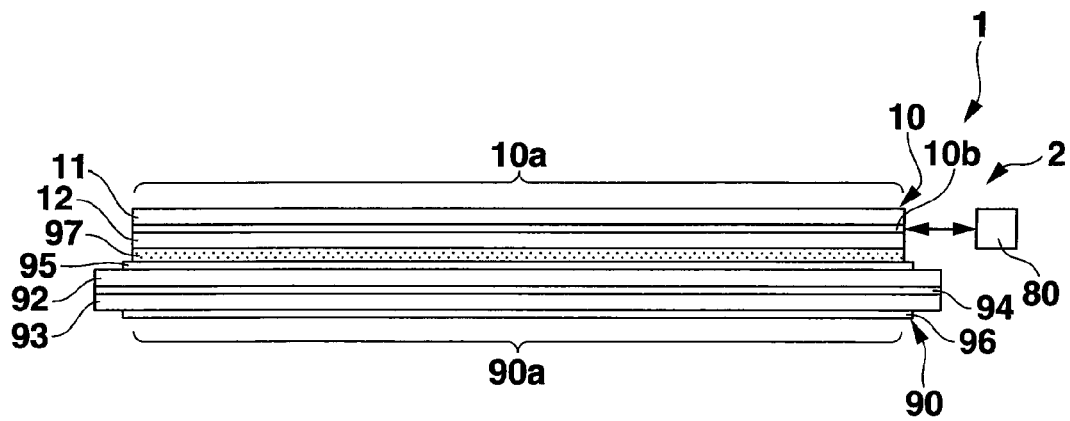
FIG. 1 is a side view illustrating a configuration example of a display device comprising a touch panel device.

FIG. 1 is a schematic side view of a touch panel device 2 of the present embodiment when the touch panel device 2 is mounted to a display device 1. The display device 1 comprises a display panel 90 configured to display an image on an image display region 90a, and a touch panel device 2 including a touch detection region 10a arranged so as to face the image display region 90a of the display panel 90. The touch panel device 2 is arranged on the side from which the user observes an image displayed on the image display region 90a, with respect to the display panel 90.

The display panel 90 includes a plurality of pixels arranged in the image display region 90a, and is an active matrix liquid display panel 90, for example. The active matrix liquid crystal display panel 90 includes a pair of transparent substrates 92, 93 arranged so as opposite to each other at a predetermined interval, bonded with a frame-shaped sealing member 94 at the circumferential portion and formed of glass, for example. The pair of substrates 92, 93 are interposed by a pair of polarizing plates 95, 96. In the description that follows, one of the pair of substrates 92, 93 arranged at the side closer to the touch panel device 2 will be referred to as a observation-side substrate 92, and the other of the pair of substrates 92, 93 arranged on the side farther from the touch panel device 2 will be referred to as a rear substrate 93. Further, one of the pair of the polarizing plates 95, 96 arranged at the side closer to the touch panel device 2 will be referred to as a observation-side polarizing plates 95, and the other of the pair of the polarizing plates 95, 96 arranged on the side farther from the touch panel device 2 will be referred to as a rear polarizing plate 96.

On the surface of the observation-side substrate 92 facing the rear substrate 93, a common electrode formed of a transparent conductive material, such as indium tin oxide, into a shape of one film, is provided. On the surface of the rear substrate 93 facing the observation-side substrate 92, a plurality of pixel electrodes are provided so as to face the common electrode. Each of the pixel electrodes is connected to a thin-film transistor. In a region of the gap between the observation-side substrate 92 and the rear substrate 93 that is surrounded by the sealing member 94, liquid crystals are sealed. That is, the active matrix liquid crystal display panel 90 is configured such that a plurality of pixels are arranged in the image display region 90a, such that a liquid crystal layer is provided between the pixel electrode connected to the thin-film transistor and the common electrode facing the pixel electrode in each of the pixels. By controlling the potential difference between the pixel electrode and the common electrode, the orientation state of the liquid crystals vary, and thereby the amount of light transmitted through the display panel 90 can be controlled.

The orientation mode of the liquid crystal layer may be any of a twisted nematic type, a super-twisted nematic type, or a non-twisted homogeneous type, a vertically-aligned type, and a bend-aligned type. The dielectric constant anisotropy of the liquid crystals sealed in the liquid crystal layer may be positive or negative. Furthermore, the liquid crystals may be ferroelectric or antiferroelectric. The display panel 90 may be configured to control the orientation state of the liquid crystals through an in-plane electric field as well as a vertical electric field. Moreover, the display panel 90 is not limited to a liquid crystal display panel, and may be a display panel using an organic electroluminescence (EL).

The touch panel device 2 includes a touch panel 10 including a touch detection region 10a, and a driving circuit 80 configured to detect a touched position on the touch detection region 10a.

The touch panel 10 includes a pair of substrates 11, 12 formed of a transparent material. Hereinafter, one of the pair of substrates 11, 12 arranged farther from the display panel 90 will be referred to as a first substrate 11, and the other substrate arranged closer to the display panel 90 will be referred to as a second substrate 12.

The touch panel 10 is integrally formed with the display panel 90 by bonding the second substrate 12 to the observation-side polarizing plates 95 of the display panel 90 with an adhesive layer 97 formed of a transparent adhesive material, resin, or the like.

The configuration of the touch panel 10 will be described in detail below. The first substrate 11 is a glass plate, a resin film, or the like, formed in the shape of a rectangular shape. The second substrate 12 is a glass plate, for example, formed in the shape of a rectangular shape having approximately the same size as that of the first substrate 11, for example.

Figure 2:
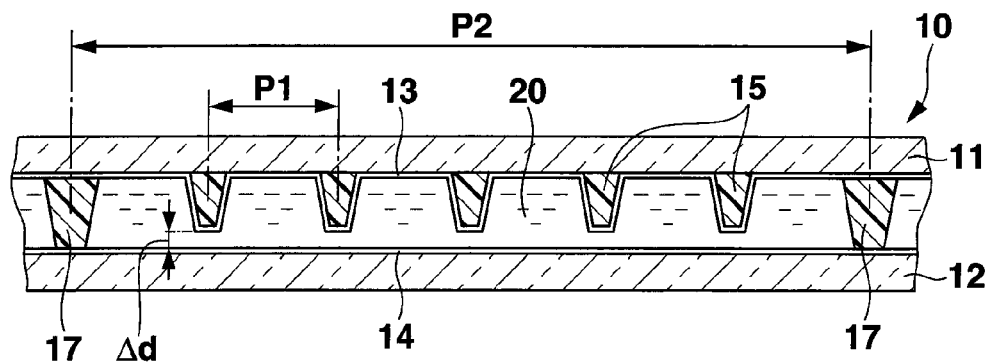
FIG. 2 is an example of an exploded cross-sectional view of the touch panel device.

As shown in FIG. 2, a transparent second resistive film 14 formed of indium tin oxide (ITO), for example, is formed on the surface of the second substrate 12 facing the first substrate 11.

On the surface of the first substrate 11 facing the second substrate 12, a plurality of projections 15 formed of a transparent insulating material are formed. The projections 15 are arranged in a matrix pattern such that the projections 15 are arranged at the equal interval of P1 in any of the two directions crossing in the substrate plane (excluding the position in which a spacer 17, which will be described later, is arranged) so as to correspond to the touch detection region 10a. The heights of the projections 15 are configured to be equal to one another.

On the first substrate 11, a transparent first resistive film 13, formed of an indium tin oxide (ITO), for example, is provided, so as to cover the projections 15. The first resistive film 13 and the second resistive film 14 are formed in a range broader than the touch detection region 10a.

On the first substrate 11, a plurality of spacers 17 formed of a transparent insulating material is provided on the first resistive film 13. The spacers 17 are arranged in a matrix such that the spacers 17 are arranged at an interval P2, which is an integral multiple of the interval P1, at which the projections 15 are arranged, and the spacers 17 are positioned at the midpoint of two adjacent projections 15.

In other words, the projections 15 are arranged under the first resistive film 13 at the interval of P1 in principle, but are not arranged at the interval of P2 exceptionally, and the spacer 17 is arranged at that position on the first resistive film 13 instead.

The heights of the spacers 17 are formed so as to be equal to one another and higher than the heights of the projections 15. Accordingly, when the second substrate is layered on the first substrate 11 such that the first resistive film 13 and the second resistive film 14 face each other, the top portions of the spacers 17 are made into contact with the second resistive film 14. Thereby, the two substrates are maintained parallel to each other by the spacers 17. In this case, a gap Δd, corresponding to the difference in height between the height of the projections 15 and the height of the spacers 17, is formed between the second resistive film 14 and a region of the first resistive film 13 covering the top portion of the projections 15.

The first substrate 11 and the second substrate 12 are bonded with a sealing member 10b applied in the shape of a frame surrounding the touch detection region, so as to be in the above-described state. In the space formed by being surrounded by the frame-shaped sealing member 10b, an insulating liquid body 20 is filled. The insulating liquid body 20 is designed decrease difference in optical refraction index between the space and the first substrate 11, the second substrate 12, the first resistive film 13 and the second resistive film 14. The difference in optical refraction index between the space and the first substrate 11, the second substrate 12, the first resistive film 13 and the second resistive film 14 is smaller than that between air and the first substrate 11, the second substrate 12, the first resistive film 13 and the second resistive film 14. The difference in optical refraction index between the insulating liquid body 20 and the substrates 11 and 12 is preferably less than or equal to 0.1, for example.

An $SiO_2$ film is preferably formed in advance as a base coat on each of the surfaces of the first substrate 11 and the second substrate 12, the surfaces facing each other. That is, the second resistive film 14 is preferably formed on the surface of the second substrate 12 facing the first substrate 11 after the $SiO_2$ film is formed as a base coat. The projections 15 are preferably formed on the surface of the first substrate 11 facing the second substrate 12 after the $SiO_2$ film is formed as a base coat.

With the above-described configuration, when the first substrate 11 is pressed by a touch from an external surface in the touch panel 10, a region of the first substrate 11 corresponding to the pressed position is bent toward the second substrate 12, and a portion of the first resistive film 13 positioned at this region will be made into contact the second resistive film 14 at the top portions of the projections 15. As a result thereof, the first resistive film 13 and the second resistive film 14 will be electrically brought into conduction in a region corresponding to the pressed position. The driving circuit 80 detects the touched positioned based on the electrical conduction, as will be described later.

Figure 3:
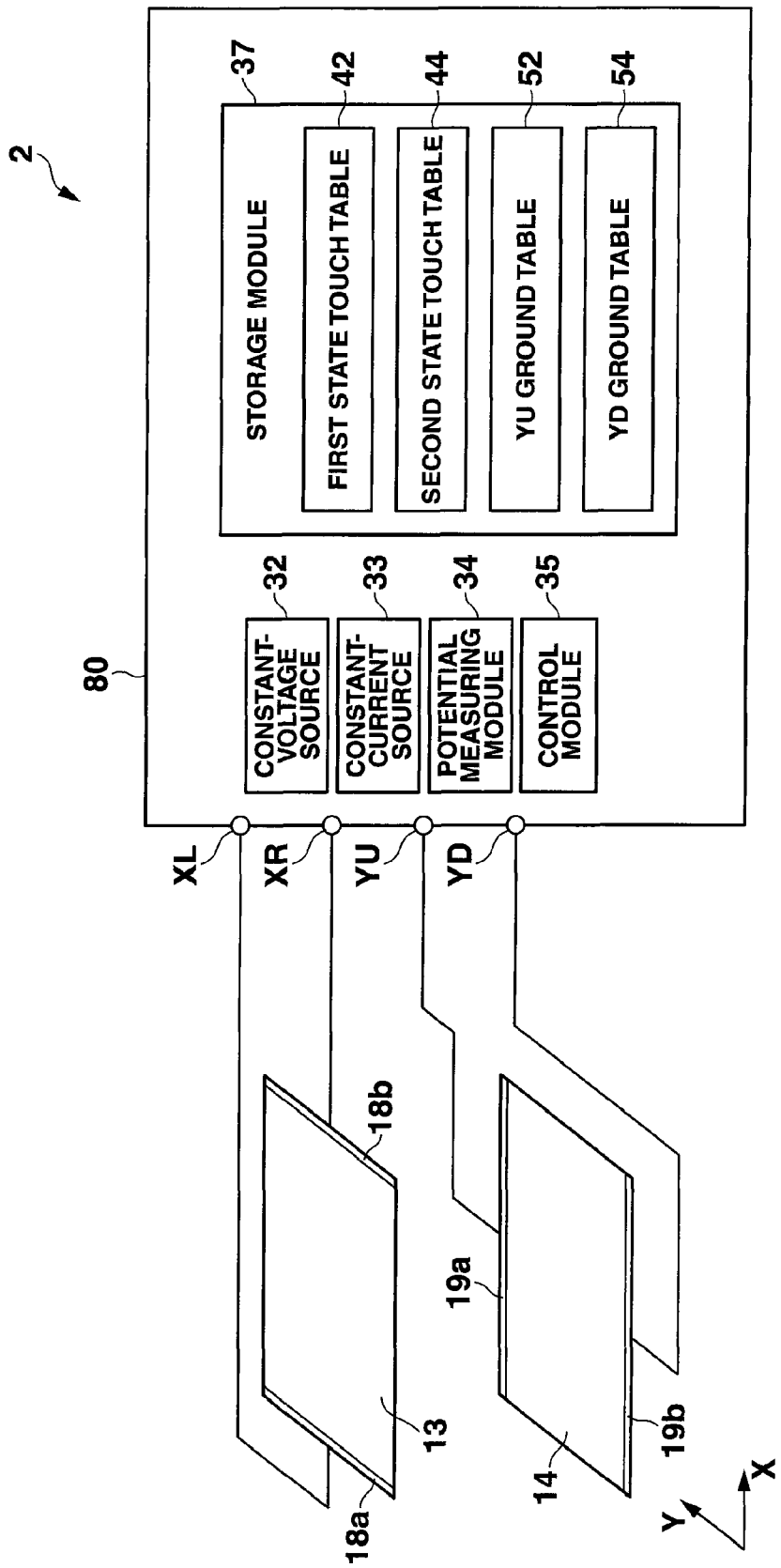
FIG. 3 illustrates an example of an overall configuration of the touch panel device according to a first embodiment.

A description will be further made by referring to the direction parallel to the side extending in the lateral direction as the X-direction, and the direction parallel to the side extending in the vertical direction as the Y-direction, of the sides of the touch panel 10 formed in a rectangular shape from a plane shape, as shown in FIG. 3.

In the first resistive film 13, a belt-shaped low-resistance electrode is formed along the Y-direction at an end region of the X-direction and an end region of a direction opposite to the X-direction (both end regions of an X-axis). That is, in the first resistive film 13, a belt-shaped left-end electrode 18a is formed as a first X-axis electrode at one edge portion (on the left side of the drawing) of the X-axis, and a belt-shaped right-end electrode 18b is formed as a second X-axis electrode at the other edge portion (on the right side of the drawing) of the X-axis. The length in the Y-direction of the left-end electrode 18a and the right-end electrode 18b are equal to the length in the Y-direction of the first resistive film 13.

In the second resistive film 14, a belt-shaped low-resistance electrode is formed along the X-direction at an end region of the Y-direction and an end region of a direction opposite to the Y-direction (both end regions of a Y-axis). That is, in the second resistive film 14, a belt-shaped upper-end electrode 19a is formed as a first Y-axis electrode at one edge portion (on the upper side of the drawing) in the Y-axis, and a belt-shaped lower-end electrode 19b is formed as a second Y-axis electrode at the other edge portion (on the lower side of the drawing) in the Y-axis. The length in the X-direction of the upper-end electrode 19a and the lower-end electrode 19b are equal to the length in the X-direction of the second resistive film 14.

The left-end electrode 18a is connected to the driving circuit 80 via a terminal XL. The right-end electrode 18b is connected to the driving circuit 80 via a terminal XR. The upper-end electrode 19a is connected to the driving circuit 80 via a terminal YU. The lower-end electrode 19b is connected to the driving circuit 80 via a terminal YD.

The driving circuit 80 includes a constant-voltage source 32, a constant-current source 33, a potential measuring module 34, a control module 35, and a storage module 37, such as a memory.

The constant-voltage source 32 and the constant-current source 33 are power supplies of a voltage or a current applied to the right-end electrode 18b via terminal XR, or to the upper-end electrode 19a via terminal YU. The potential measuring module 34 is an electrometer module designed to measure the potential of the left-end electrode 18a via terminal XL, the right-end electrode 18b via terminal XR, the upper-end electrode 19a via terminal YU, or the lower-end electrode 19b via terminal YD. The potential measuring module 34 is an analog-to-digital converter, for example, and outputs a digital value of the potential to the control module 35. The control module 35 is designed to control the entire touch panel device 2, and also functions as a computing module designed to perform arithmetic processing for detection of a touched position. The storage module 37 stores in advance "first state touch table 42", "second state touch table 44", "YU ground table 52", "YD ground table 54", and the like, which will be described later.

Figure 4:
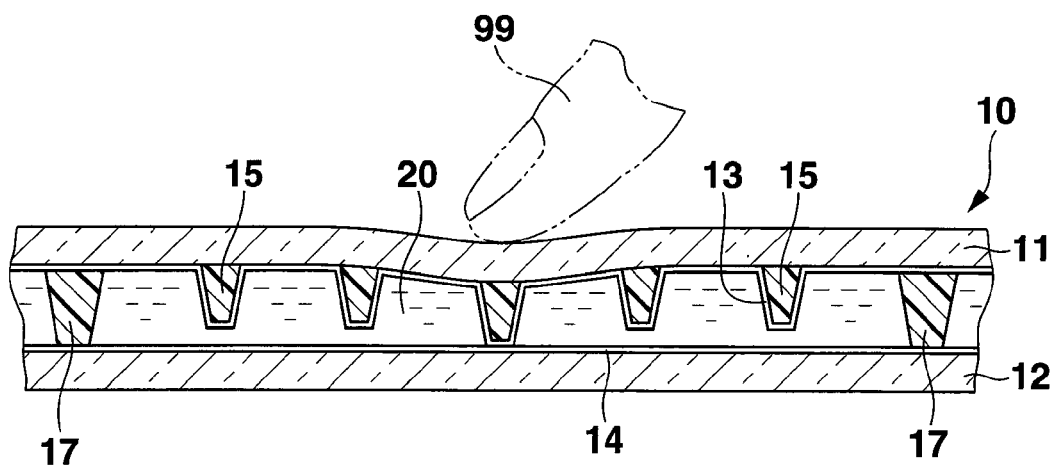
FIG. 4 is a cross-sectional view illustrating the state of the touch panel device when a portion of the touch panel device has been touched.

The operation of the touch panel device 2 according to the present embodiment will be described. When the touch panel 10 is pressed by a touch of a finger 99, for example, on the first substrate 11 from an external surface, a region of the first substrate 11 corresponding to the pressed position will be bent toward the second substrate 12, as shown in FIG. 4. In this case, a portion of the first resistive film 13 positioned in this region will be made into contact with the second resistive film 14 at the top portion of the projections 15. As a result thereof, the first resistive film 13 and the second resistive film 14 will be electrically brought into conduction in a region corresponding to the pressed position.

In FIG. 4, the scale of the projections 15, for example, is different from the actual scale and is enlarged for emphasis for the sake of simplicity. FIG. 4 shows a state in which the first substrate 11 is pressed by a finger and thereby the first resistive film 13 is made into contact with the second resistive film 14 on the one projection 15. However, the description that follows is similarly applicable to a case where the first resistive film 13 is made into contact with the second resistive film 14 on a plurality of the projections 15 adjacent to one another when one portion has been pressed.

Figure 5:
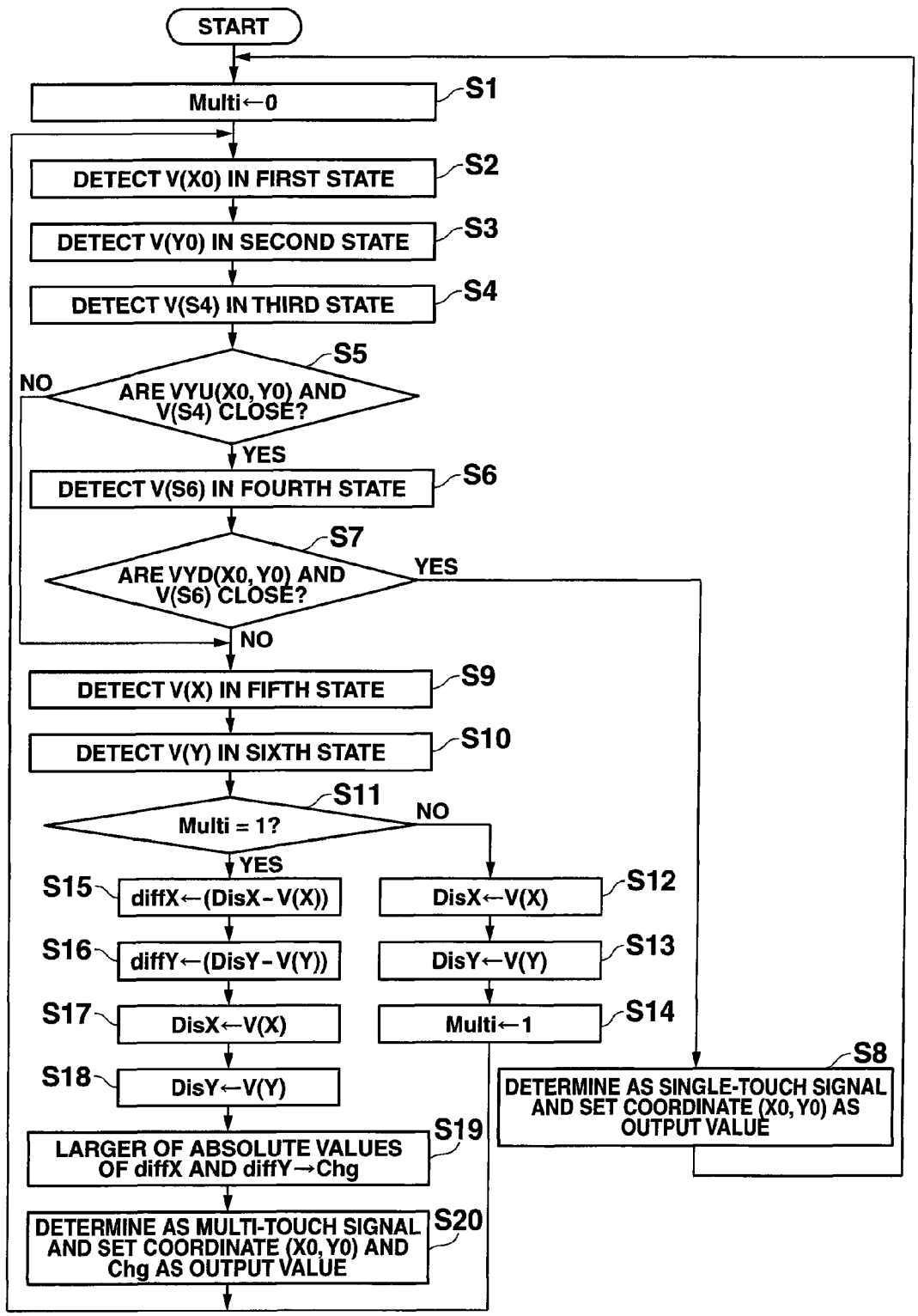
FIG. 5 is a flowchart illustrating a procedure of detecting a touched position on the touch panel device.

A method of detecting the touched position according to the present embodiment will be described with reference to the flowchart shown in FIG. 5. In this detection method, it is possible to determine whether one point has been touched or two points have been simultaneously touched in the touch detection region. Furthermore, when two points are simultaneously touched, information on distance between the two points, and in particular, information on a change in distance between the two points can be detected. The information on a change in distance between the two points refers to information indicating whether the distance between the two points that have been simultaneously touched has increased or decreased than before. That is, according to the detection method of the present embodiment, it is possible to determine whether one point is in contact or two points are simultaneously in contact between the first resistive film 13 and the second resistive film 14. Further, it is also possible to detect information on distance between two points when the two points are simultaneously in contact.

First, in step S1, the control module 35 substitutes "0" into a variable Multi used as a flag when information on variation in distance between the two points is derived.

Figures 6, 7:
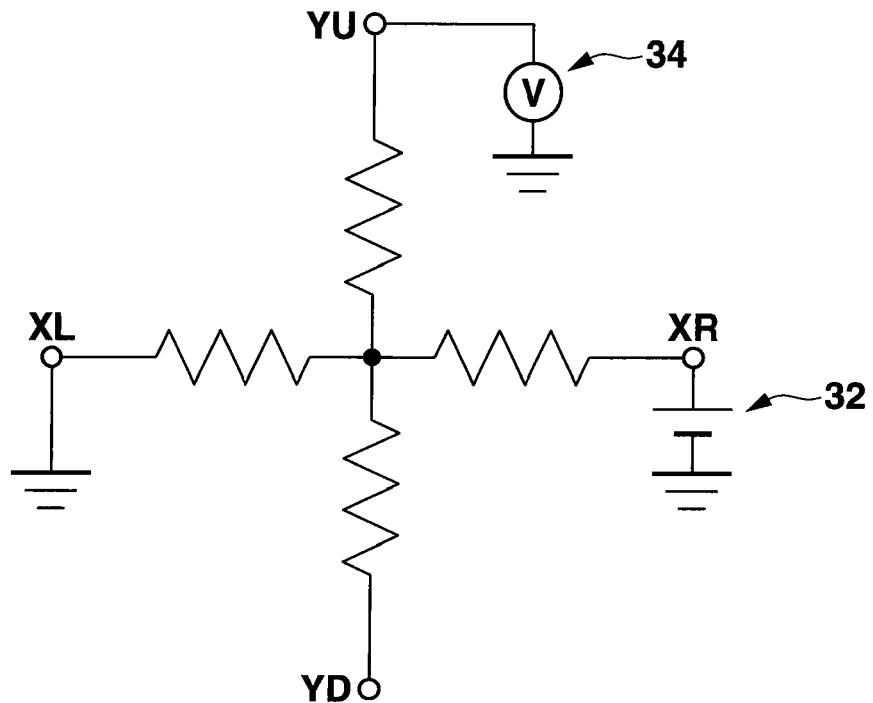
FIG. 6 is a circuit diagram illustrating a first state set by a driving circuit.
FIG. 7 illustrates an example of potentials detected in the first state.

In step S2, the control module 35 grounds terminal XL and connects the constant-voltage source 32 to terminal XR and applies a voltage thereto, as shown in FIG. 6. At the same time, terminal YD is not connected to anything, and the potential measuring module 34 is connected to terminal YU. This state will be referred to as a first state. That is, in the first state, a voltage is applied between the both ends 18a, 18b of the first resistive film 13, as viewed in the X-axis, and one end 19b of the second resistive film 14, as viewed in the Y-axis, is made open. The potential measuring unit 34 is connected such that the potential at the other end 19a of the second resistive film 14, as viewed in the Y-axis, can be measured.

As described above, for example, the left-end electrode 18a functions as a first end region. For example, the right-end electrode 18b functions as a second end region. For example, the lower-end electrode 19b functions as a third end region. For example, the upper-end electrode 19a functions as a fourth end region.

Assume that, in the X-direction of the first resistive film 13, the value of an X-coordinate at the end of the side on which the left-end electrode 18a is arranged is 0, the value of an X-coordinate at the end of the side on which the right-end electrode 18b is arranged is 1, the value of an X-coordinate at a touched position when one point has been touched is x, the resistance value between the both ends of the X-axis of the first resistive film 13 is rx, and the inner resistance value of the potential measuring module 34 is R. In the first state, the voltage applied between the both ends of the first resistive film 13, as viewed in the X-axis, by the constant-voltage source 32 is V0, since rx<<R, the potential V(x) measured by the potential measuring module 34 can be expressed as follows:

$$V(x) = V0 \cdot x \qquad (1)$$

In this way, in the first state, the value of one touched X-coordinate can be detected based on the potential V(x) measured by the potential measuring module 34, when the number of touched positions is only one.

In the description of the present embodiment that follows, coordinates expressed by a matrix obtained by dividing the touch detection region 10a of the touch panel 10 into 6 divisions (X1-X6) in the X-direction, and into 8 divisions (Y1-Y8) in the Y-direction, will be used as an example. In the X-direction, X1 is on the side of the left-end electrode 18a, and X6 is on the side of the right-end electrode 18b. In the Y-direction, Y1 is on the side of the upper-end electrode 19a, and Y8 is on the side of the lower-end electrode 19b. In this example, a description will be made by showing an example of a potential measured when the voltage of the voltage source is set to 5.0 V.

FIG. 7 shows an example of the relationship between the touched position and the potential measured by the potential measuring module 34 when only one point has been touched in the touch detection region 10a in the first state. As shown in FIG. 7, in the X-direction, since different potentials can be detected according to the touched position, the control module 35 is capable of determining the value of the X-coordinate at the touched position based on the potential measured by the potential measuring module 34.

When two points are simultaneously touched in the first state, however, since the potential measured by the potential measuring module 34 will be the same as that as shown in FIG. 7, the control module 35 cannot determine whether only one point has been touched or two points have been touched at this stage. Accordingly, at this stage, even when only one point has been touched in actuality, the control module 35 cannot determine the value of the X-coordinate at the touched position.

That is, when two points are touched simultaneously in the first state, since the potential measured by the potential measuring module 34 will be equal to the potential of the case where the position in the midpoint of the touched two points has been touched as this only one position, the control module 35 cannot determine whether one point has been touched or two points have been touched at this stage. For example, when the two points of coordinates (X5, Y1) and (X3, Y7) are simultaneously touched, the potential measured by the potential measuring module 34 will be 2.9 V, which is the same as that of the case where only one point corresponding to X4 has been touched.

In step S2, the control module 35 obtains a potential V(X0) measured by the potential measuring module 34 in the first state, regardless of whether one point has been touched or two points have been simultaneously touched. The control module 35 derives the value X0 of the X-coordinate as first reference data, based on the obtained potential V(X0) and the equation (1). In this case, X0 indicates the value of the X-coordinate in the touched position when one point has been touched, and the value of the X-coordinate in a midpoint between the touched two points when two points have been simultaneously touched.

The value X0 of the X-coordinate is not limited to the value obtained based on the acquired potential V(X0) and the equation (1). For example, the relationship between the touched position and the potential measured by the potential measuring module 34 when only one point has been touched in the touch detection region 10a in the first state is acquired in advance as a first state touch table 42, as shown in FIG. 7, and the table is stored in the storage module 37. The control module 35 may derive the value X0 of the X-coordinate based on the acquired potential V(X0) by referring to the first state touch table 42.

In step S3, the control module 35 applies a voltage of 5 V by connecting the constant-voltage source 32 to terminal YU and grounds terminal YD. At the same time, terminal XL is not connected to anything, and the potential measuring module 34 is connected to terminal XR. This state will be referred to as a second state. That is, in the second state, a voltage is applied between the both ends 19a, 19b of the second resistive film 14, as viewed in the Y-axis, and one end 18a of the first resistive film 13, as viewed in the X-axis, is made open. The potential measuring module 34 is connected such that a potential at the other end 18b of the first resistive film 13, as viewed in the X-axis, can be measured.

In this case, in the Y-direction of the first resistive film 13, assume that the value of the Y-coordinate at the end of the side on which the upper-end electrode 19a is provided is 0, the value of the Y-coordinate at the end of the side on which the lower-end electrode 19b is provided is 1, the value of the Y-coordinate at the touched positioned when one point has been touched is y, the resistance value between the both ends in the Y-axis of the first resistive film 13 is ry, and the inner resistance value of the potential measuring module 34 is R. In the second state, assuming that the voltage applied to between the both ends of the first resistive film 13, as viewed in the Y-axis, by the constant-voltage source 32 is V0, since ry<<R, the potential V(y) measured by the potential measuring module 34 can be expressed as follows:

$$V(y)=V0 \cdot y \quad (2).$$

In this way, in the second state, when only one point has been touched, the value of the Y-coordinate of the touched one point can be detected based on the potential measured by the potential measuring module 34.

Figures 8, 9:
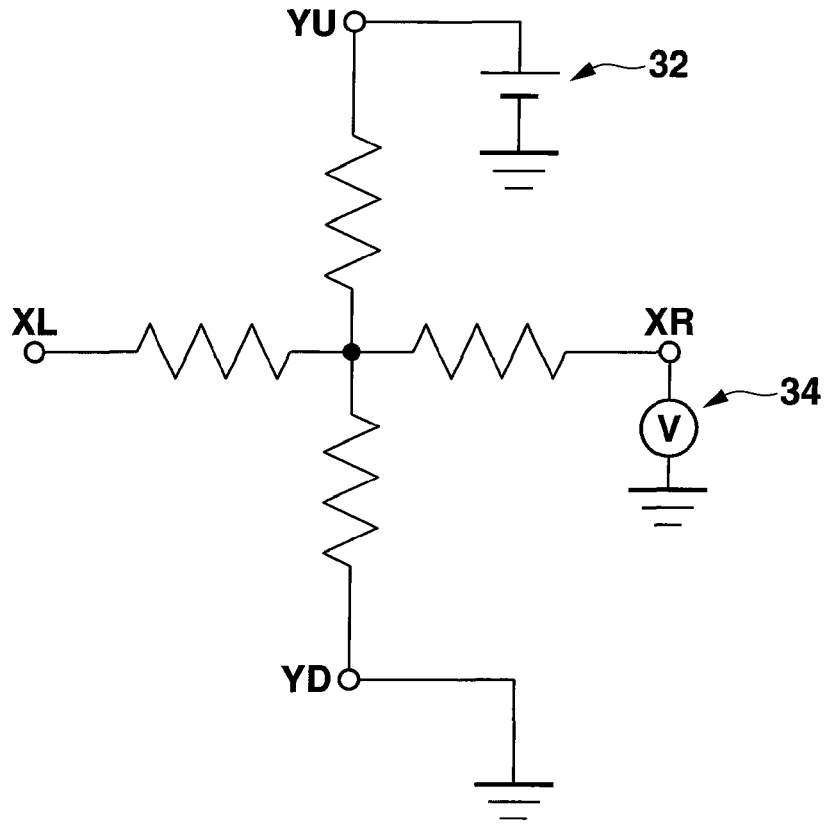
FIG. 8 is a circuit diagram illustrating a second state set by the driving circuit.
FIG. 9 illustrates an example of potentials detected in the second state.

FIG. 9 shows an example of the relationship between the touched position and the potential measured by the potential measuring module 34 when only one point has been touched in the touch detection region 10a in the second state. As shown in FIG. 9, in the Y-direction, since different potentials can be detected according to the touched position, when only one point is touched, the control module 35 can determine the value of the Y-coordinate at the touched position based on the potential measured by the potential measuring module 34.

When two points have been simultaneously touched in the second state, however, the potential measured by the potential measuring module 34 will be similar to the potential shown in FIG. 9, and the control module 35 cannot determine whether only one point has been touched or two points have been touched at this stage. Accordingly, even if only one point has been touched in actuality, the control module 35 cannot determine the position of the Y-coordinate at the touched position at this stage.

When two points have been touched simultaneously in the second state, the potential measured by the potential measuring module 34 will be equal to the potential of the case where a midpoint of the two touched points has been touched as only one touched position, and the control module 35 cannot determine whether one point has been touched or two points have been touched at this stage. For example, when two points of coordinate (X5, Y1) and coordinate (X3, Y7) are simultaneously touched, the potential measured by the potential measuring module 34 will be 2.8 V, which is the same as the case where only one point corresponding to Y4 has been touched.

In step S3, the control module 35 acquires a potential V(Y0) measured by the potential measuring module 34 in the second state, regardless of whether one point has been touched or two points have been simultaneously touched. The control module 35 derives the value Y0 of the Y-coordinate as the second reference data based on the acquired potential V(Y0) and the equation (2). In this case, Y0 indicates a Y-coordinate of the touched position when one point has been touched, and the value of the Y-coordinate in the position of the midpoint between the two touched points when two points have been simultaneously touched.

The value Y0 of the Y-coordinate is not limited to the value obtained based on the acquired potential V(Y0) and the equation (2). For example, the relationship between the touched position and the potential measured by the potential measuring module 34 when only one point has been touched in the touch detection region 10a in the second state is acquired as a second state touch table 44, as shown in FIG. 9, and the table is stored in the storage module 37. The control module 35 may refer to the second state touch table 44 and derive the value Y0 of the Y-coordinate based on the acquired potential V(Y0).

Figures 10, 11:
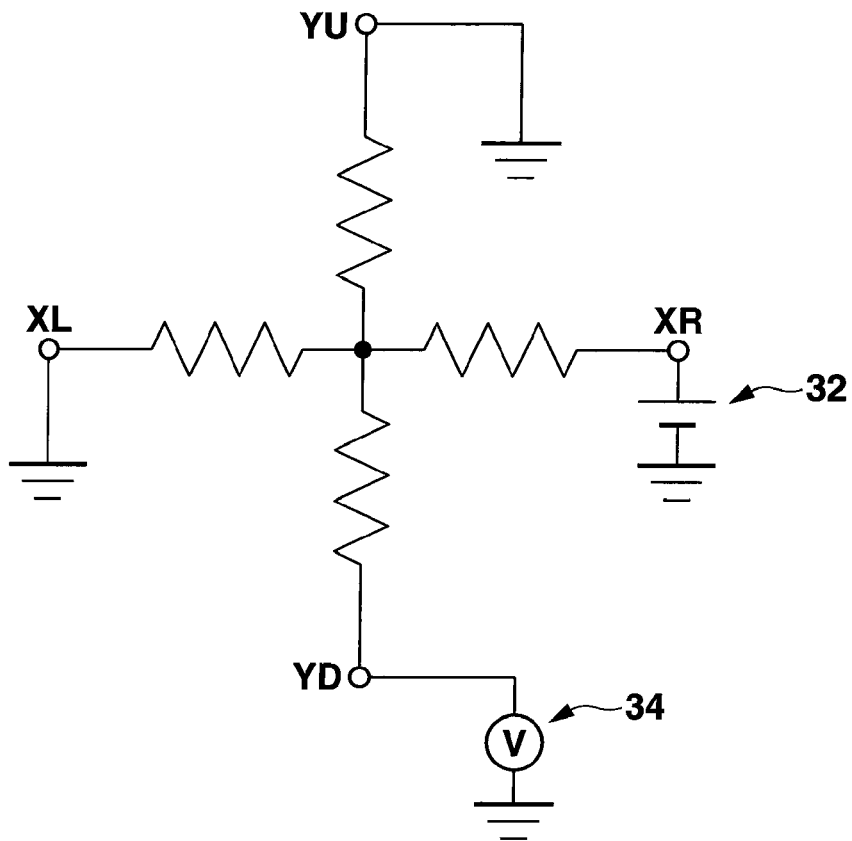
FIG. 10 is a circuit diagram illustrating a third state set by the driving circuit.
FIG. 11 illustrates an example of potentials that are detected when one point has been touched in the third state, and an example of a YU ground table stored in a storage module.

In step S4, the control module 35 applies a voltage of 5 V by connecting the constant-voltage source 32 to terminal XR and grounds terminal XL, as shown in FIG. 10. At the same time, terminal YU is grounded and the potential measuring module 34 is connected to terminal YD. This state will be referred to as the third state. That is, in the third state, one end 18a of the first resistive film 13, as viewed in the X-axis, and the other end 19a of the second resistive film 14, as viewed in the Y-axis, are short-circuited, and the voltage is applied between the both ends 18a, 18b of the first resistive film 13, as viewed in the X-axis. The potential measuring module 34 is connected such that the potential at one end 19*b* of the second resistive film 14, as viewed in the Y-axis can be measured.

FIG. 11 shows an example of the relationship between the touched position and the potential measured by the potential measuring module 34 when only one point has been touched in the touch detection region 10*a* in the third state, as in the case of FIG. 7. The relationship shown in FIG. 11 will be referred to as YU ground table 52. In the present embodiment, the YU ground table 52 is acquired in advance and stored in the storage module 37. Since terminal XL and terminal YU are grounded, the YU ground table 52 has a low potential in the column of X1 and the row of Y1, and has a high potential at (X6, Y8).

In step S4, when only one point has been touched, the potential shown in the YU ground table 52 is measured by the potential measuring module 34, according to the touched position.

When two points have been touched, on the other hand, the following potential will be measured. That is, when two points of coordinates (X5, Y1) and (X3, Y7), at which a voltage of 2.9 V is detected in step S1 and a voltage of 2.8 V is detected in step S2, have been simultaneously touched, for example, a voltage of 1.1 V will be detected.

In this concrete example, there are 17 pairs of touched positions at which a voltage of 2.9 V is detected in step S2 and a voltage of 2.8 V is detected in step S3, as a result of two points being simultaneously touched. FIG. 12 illustrates the relationship between the 17 pairs of touched positions and the potential measured by the potential measuring module 34. In FIG. 12, the same values are assigned to two points that are simultaneously touched. For example, FIG. 12 shows that a voltage of 1.0 V will be detected in step S4 when coordinates (X2, Y6) and (X6, Y2) are simultaneously touched. Further, when coordinates (X3, Y3) and (X5, Y5) are simultaneously touched, for example, a voltage of 1.7 V will be detected in step S4. As shown in FIG. 12, even when a voltage of 2.9 V is detected in step S2 and a voltage of 2.8 V is detected in step S3, the potential measured by the potential measuring module 34 in step 4 will differ according to the combination of the two points that are simultaneously touched.

In step S4, the control module 35 acquires a potential V(S4) measured by the potential measuring module 34 in the third state regardless of whether one point has been touched or two points are simultaneously touched.

In step S5, the control module 35 reads the above-noted YU ground table 52 from the storage module 37. The control module 35 compares a value VYU(X0, Y0) of coordinates (X0, Y0) of the YU ground table 52 and V(S4) acquired in step S4, based on X0 obtained as the first reference data in step S2 and Y0 obtained as the second reference data in step S3. When the difference between VYU(X0, Y0) and V(S4) is greater than a predetermined first threshold value, the control module 35 shifts the procedure to step S9. When the difference between VYU(X0, Y0) and V(S4) is less than or equal to the first threshold value, the control module 35 shifts the procedure to step S6.

For example, assume that the first threshold value is 0.4. In the example shown in FIG. 11, VYU(X4, Y4)=1.0 V. Since V(S4) will be greater than or equal to 1.5 V when the coordinates with a "o" mark in FIG. 13 have been touched, the difference will be greater than the first threshold value, and the procedure will be shifted to step S9. Since V(S4) will be greater than or equal to 0.6 V and less than or equal to 1.4 V when the coordinates with an "x" mark are touched in FIG. 13, on the other hand, the difference will be less than or equal to the first threshold value, and the procedure will be shifted to step S6. In this example, the first threshold value is set to 0.4, but is adjusted according to the touch panel employed.

Figures 14, 15:
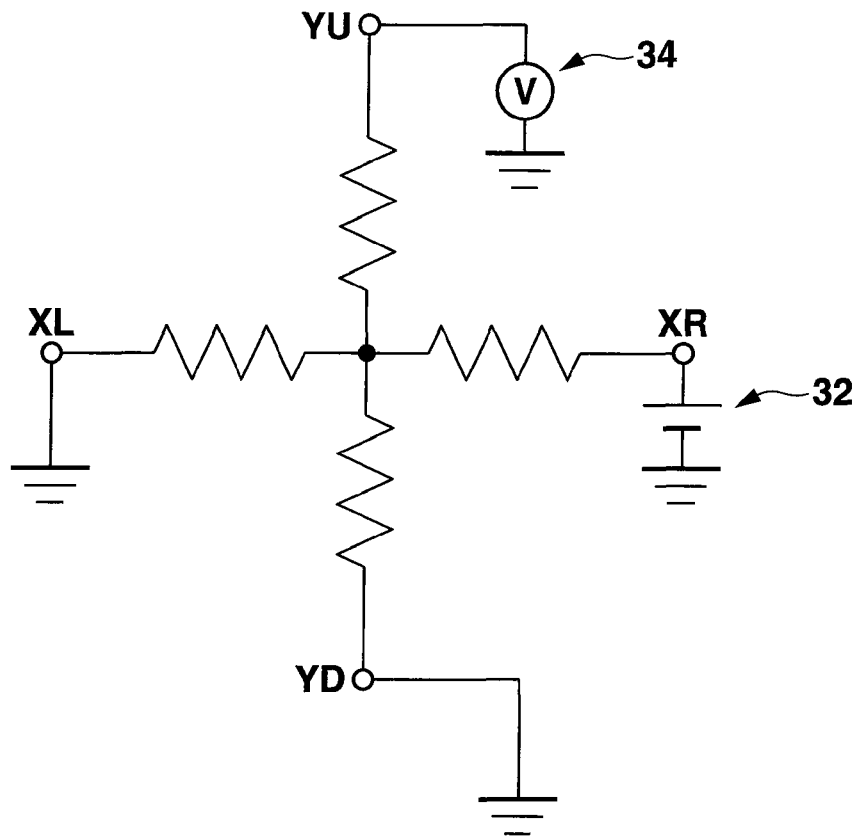
FIG. 14 is a circuit diagram illustrating a fourth state set by the driving circuit.
FIG. 15 illustrates an example of potentials that are detected when one point has been touched in the fourth state, and an example of the YU ground table stored in the storage module.

In step S6, the control module 35 applies a voltage of 5 V by connecting the constant-voltage source 32 to terminal XR and grounds terminal XL, as shown in FIG. 14. At the same time, terminal YD is grounded and the potential measuring module 34 is connected to terminal YU. This state will be referred to as the fourth state. That is, in the fourth state, one end 18*a* of the first resistive film 13, as viewed in the X-axis, and one end 19*b* of the second resistive film 14, as viewed in the Y-axis, are short-circuited, and the voltage as applied between the both ends 18*a*, 18*b* of the first resistive film 13, as viewed in the X-axis. The potential measuring module 34 is connected such that the potential at the other end 19*a* of the second resistive film 14, as viewed in the Y-axis, can be measured.

FIG. 15 shows an example of the relationship between the touched position and the potential measured by the potential measuring module 34 when only one point has been touched in the touch detection region 10*a* in the fourth state similar to the YU ground table 52 shown in FIG. 11. The relationship shown in FIG. 15 will be referred to as YU ground table 52. In the present embodiment, the YU ground table 52 is acquired in advance and stored in the storage module 37.

In step S6, when only one point has been touched, the potential shown in the YD ground table 54 is measured by the potential measuring module 34, according to the touched position.

When two points have been touched, on the other hand, the following potential will be measured. When two points of coordinates (X5, Y1) and (X3, Y7), at which a voltage of 2.9 V is detected in step S2 and a voltage of 2.8 V is detected in step 33, have been simultaneously touched, for example, a voltage of 2.1 V will be detected.

In this concrete example, there are 17 pairs of touched positions at which a voltage of 2.9 V is detected in step S2 and a voltage of 2.8 V is detected in step S3, as a result of two points being simultaneously touched. FIG. 16 illustrates the relationship between the 17 pairs of touched positions and the potential measured by the potential measuring module 34. In FIG. 16, the same values are assigned to two points that are simultaneously touched. For example, FIG. 16 shows that a voltage of 2.2 V will be detected in step S6 when coordinates (X2, Y6) and (X6, Y2) are simultaneously touched. Further, when coordinates (X3, Y3) and (X5, Y5) are simultaneously touched, for example, a voltage of 1.6 V will be detected in step S6. As shown in FIG. 16, even when a voltage of 2.9 V is detected in step S2 and a voltage of 2.8 V is detected in step S3, the potential measured by the potential measuring module 34 will differ according to the combination of the two points that are simultaneously touched.

In step S6, the control module 35 acquires a potential V(S6) measured by the potential measuring module 34 in the fourth state regardless of whether one point has been touched or two points are simultaneously touched.

In step S7, the control module 35 reads the above-noted YD ground table 54 from the storage module 37. The control module 35 compares a value VYD(X0, Y0) of coordinates (X0, Y0) of the YD ground table 54 and V(S6) acquired in step S6, based on X0 obtained as the first reference data in step S2 and Y0 obtained as the second reference data in step S3. When the difference between VYD(X0, Y0) and V(S6) is greater than a predetermined second threshold value, the control module 35 shifts the procedure to step S8. When the difference between VYD(X0,Y0) and V(S6) is less than or equal to the second threshold value, the control module 35 shifts the procedure to step S8.

For example, assume that the second threshold value is 0.6. In the example shown in FIG. 15, VYD(X4, Y4)=1.2 V. Since V(S6) will be greater than or equal to 1.9 V when the coordinates with a "o" mark in FIG. 17 have been touched, the difference will be greater than the second threshold value, and the procedure will be shifted to step S9. Since V(S6) will be greater than or equal to 0.6 V and less than or equal to 1.8 V when the coordinates with an "x" mark are touched in FIG. 17, on the other hand, the difference will be less than or equal to the second threshold value, and the procedure will be shifted to step S8. In this example, the second threshold value is set to 0.6, but is adjusted according to the touch panel employed.

As described above, it is when the value of V(S4) and the value of VYU(X0, Y0) are determined as being close in step S5 and the value of V(S6) and the value of VYD(X0, Y0) are determined as being close in step S7 that the procedure is shifted to step S8. The control module 35 determines in step S8 that such a case is a single touch in which only one point has been touched in the touch detection region. In this case, the position of the X-coordinate of the touched position when only one point has been touched in the touch detection region has been derived as the first reference data X0 in step S2, and the position of the Y-coordinate thereof has been derived as the second reference data Y0 in step S3.

Accordingly, in step S8, the control module 35 outputs a signal indicating that the touch is a single touch and including information relating to coordinate (X0, Y0) as a touched position as a value detected by the touch panel device 2. After that, the control module 35 shifts the procedure to step S1. The detected value is output to the control device of the electronic device in which the display device 1 is incorporated, for example. The control device that has acquired the detected value determines that only one point has been touched in the touch panel, and is capable of executing a predetermined procedure compliant with a single touch.

When the touch cannot be determined as a single touch after following step S5 and step S7 in sequence, the procedure is shifted to step S9. In such a case, the control module 35 determines that the two points have been simultaneously touched. The control module 35 determines that such a case is a multi-touch in which two points are simultaneously touched in the touch detection region, and starts deriving the distance between the simultaneously touched two points.

Figure 18:
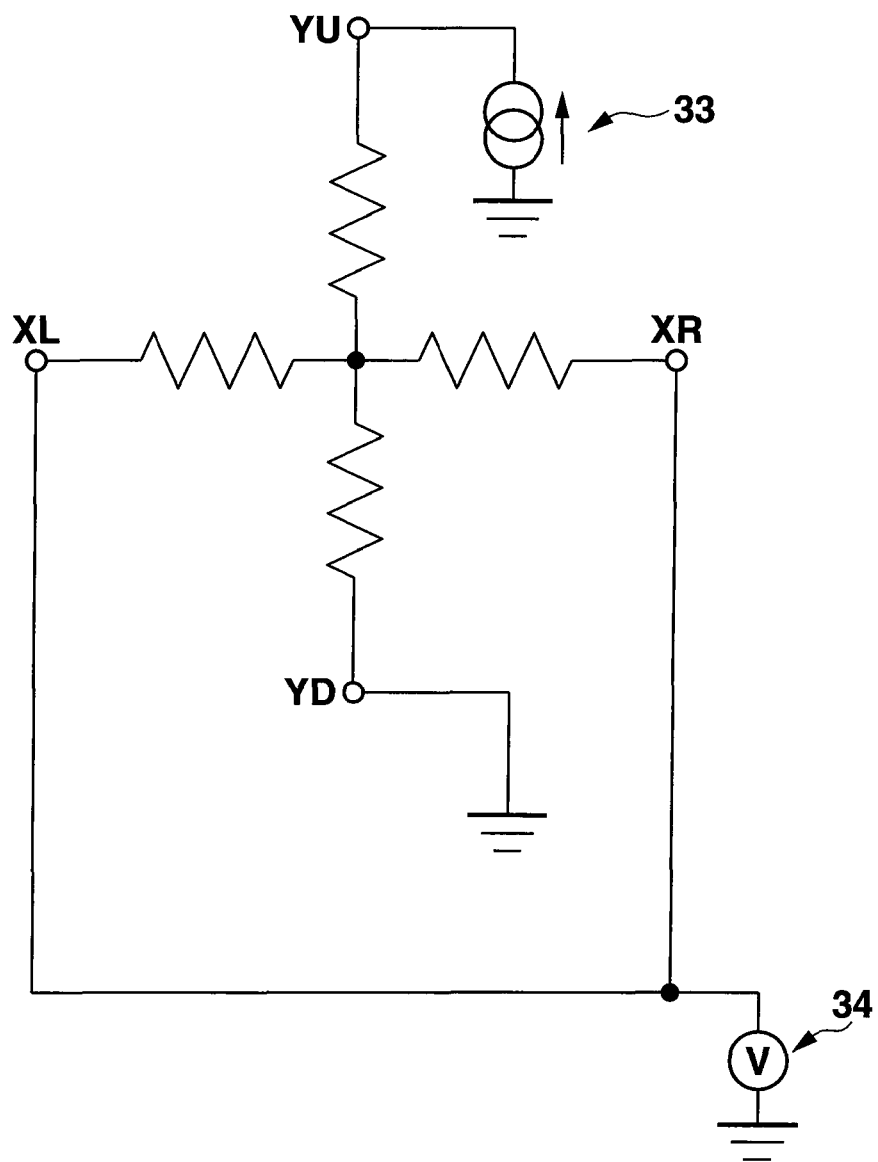
FIG. 18 is a circuit diagram illustrating a fifth state set by the driving circuit.

In step S9, as shown in FIG. 18, the control module 35 connects the constant-current source 33 to terminal YU, and grounds terminal YD. At the same time, the control module 35 short-circuits terminal XL and terminal XR, and connects the potential measuring module 34 thereto. This state will be referred to as a fifth state. That is, in the fifth state, the both ends 18a, 18b of the first resistive film 13, as viewed in the X-axis, are short-circuited, and a current is supplied to between the both ends 19a, 19b of the second resistive film 14, as viewed in the Y-axis. The potential measuring module 34 is connected so as to be capable of measuring the potential at the both ends 18a, 18b of the first resistive film 13, as viewed in the X-axis.

A description will be made in detail below, based on the assumption that the constant-current source 33 supplies a current of 10 mA.

Figure 19:
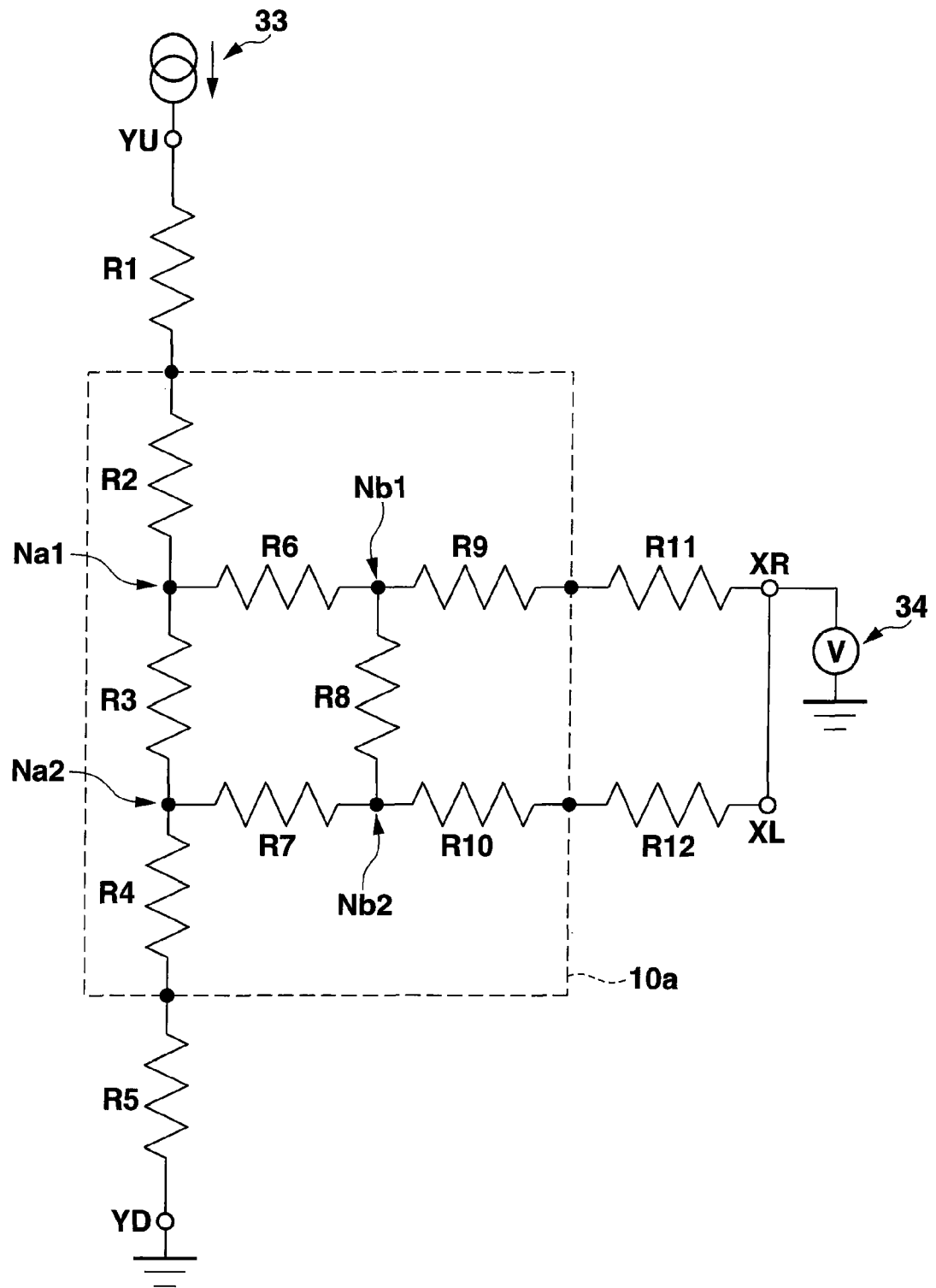
FIG. 19 is an equivalent circuit diagram illustrating a case where two points are touched in the fifth state.

FIG. 19 illustrates the fifth state when two points are touched in the touch detection region 10a, as a more detailed equivalent circuit. In FIG. 19, the region surrounded by the broken line corresponds to the touch detection region 10a. That is, the region surrounded by the broken line corresponds to the region in which the first resistive film 13 and the second resistive film 14 are formed.

The resistance from terminal YU to the second resistive film 14 will be referred to as R1, and the resistance from terminal YD to the second resistive film 14 will be referred to as R5. The resistance from terminal XR to the first resistive film 13 will be referred to as R11, and the resistance from terminal XL to the first resistive film 13 will be referred to as R12. That is, R1, R5, R11, and R12 indicate a wiring resistance, for example, in regions other than the touch detection region 10a, and is a constant unique to each touch panel.

In FIG. 19, node Na1 indicates a point on the second resistive film 14 at one of the two touched points. Node Nb1 indicates a point on the first resistive film 13 at one of the two touched points. Accordingly, resistance R6 indicates a contact resistance between the second resistive film 14 and the first resistive film 13 at one of the two touched points.

Node Na2 indicates a point on the second resistive film 14 at the other point of the two touched points. Node Nb2 indicates a point on the first resistive film 13 at the other point of the two touched points. Accordingly, resistance R7 indicates a contact resistance between the second resistive film 14 and the first resistive film 13 at the other point of the two touched points.

The resistance of the second resistive film 14 in the Y-direction can be shown as an equivalent circuit in which the resistance is divided into three, using the two touched points as boundaries. More specifically, the resistance of the second resistive film 14 in the Y-direction can be shown by being divided into a resistance R2 from one of the two touched points to the upper-end electrode 19a, a resistance R4 from the other point of the two touched points to the lower-end electrode 19b, and a resistance R3 between the two touched points.

The resistance of the first resistive film 13 in the X-direction is referred to as follows: the resistance between the two touched points as R8; the resistance from one of the two touched points closer to the right-end electrode 18b to the right-end electrode 18b as R9; and the resistance from one of the two touched points closer to the left-end electrode 18a to the left-end electrode 18a as R10.

Since R6 and R7 indicate a contact resistance between the first resistive film 13 and the second resistive film 14, the values indicated by R6 and R7 do not vary depending on the distance between the two touched points. On the other hand, the values indicated by R2, R3, R4, R8, R9 and R10 vary depending on the distance between the two touched points. For example, as the distance between the two touched points increases, the values indicated by R3 and R8 increase, and the values indicated by R2, R4, R9, and R10 decrease. In other words, as the distance between the two touched points decreases, the values indicated by R3 and R8 decrease, and the values indicated by R2, R4, R9, and R10 increase.

Since the constant-current source 33 is used as a power supply in the fifth state, the amount of current that flows into R4 and R5 is constant. Accordingly, a change in potential measured by the potential measuring module 34 will be dominantly contributed by a change in R9 and R10. Therefore, by measuring a change in potential measured by the potential measuring module 34 in the fifth state, a change at R9 and R10, i.e., a change in distance between the two touched points in the X-direction can be detected.

In this fifth state, when the two points are touched such that a position of a midpoint between the two touched points is (X4, Y4), for example, potentials will be measured as follows. When two points of coordinates (X5, Y1) and (X3, Y7) are simultaneously touched, for example, in which case a potential of 2.9 V is detected in step S2 and a potential of 2.8 V is detected in step S3, a potential of 2.5 V will be detected.

Figures 20, 21:
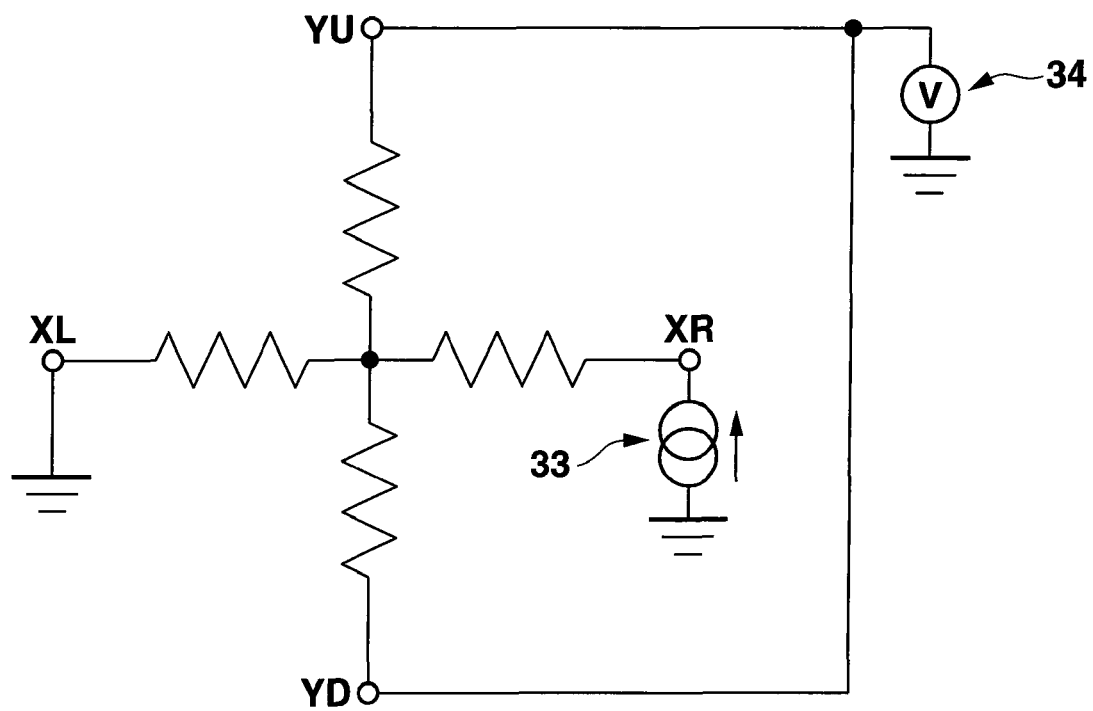
FIG. 20 illustrates an example of potentials that are detected when two points have been touched in the fifth state.
FIG. 21 is a circuit diagram illustrating a sixth state set by the driving circuit.

In this specific example, there are 17 pairs of touch positions by which a potential of 2.9 V is detected in step S2, and a potential of 2.8 V is detected in step S3 when the two points are simultaneously touched. The relationship between the 17 pairs of touched positions and the potentials measured by the potential measuring module 34 is shown in FIG. 20. In FIG. 20, the same value is shown in the two points that are simultaneously touched. For example, FIG. 20 shows that, when coordinates (X2, Y6) and (X6, Y2) are simultaneously touched, a potential of 2.0 V will be detected in step S9. Further, FIG. 20 shows that, when coordinates (X3, Y3) and (X5, Y5) are simultaneously touched, a potential of 2.4 V will be detected in step S9, for example. As shown in FIG. 20, even when a potential of 2.9 V is detected in step S2 and a potential of 2.8 V is detected in step S3, the potential measured by the potential measuring module 34 in step S9 varies depending on the combination of the two points that are simultaneously touched, and in particular, the distance between the two points in the X-direction.

In step S9, the control module 35 obtains a potential V(X) measured by the potential measuring module 34 in the above-described fifth state.

In step S10, the control module 35 connects the constant-current source 33 to terminal XR, and grounds terminal XL, as shown in FIG. 21. At the same time, terminal YU and terminal YD are short-circuited, and the potential measuring module 34 is connected thereto. This state will be referred to as a sixth state. In the sixth state, the both ends 19a, 19b of the second resistive film 14, as viewed in the Y-direction, are short-circuited, and a current is supplied to between the both ends 18a, 18b of the first resistive film 13, as viewed in the X-direction. The potential measuring module 34 is connected so as to be capable of measuring the potential at the both ends 19a, 19b of the second resistive film 14, as viewed in the Y-direction.

Figure 22:
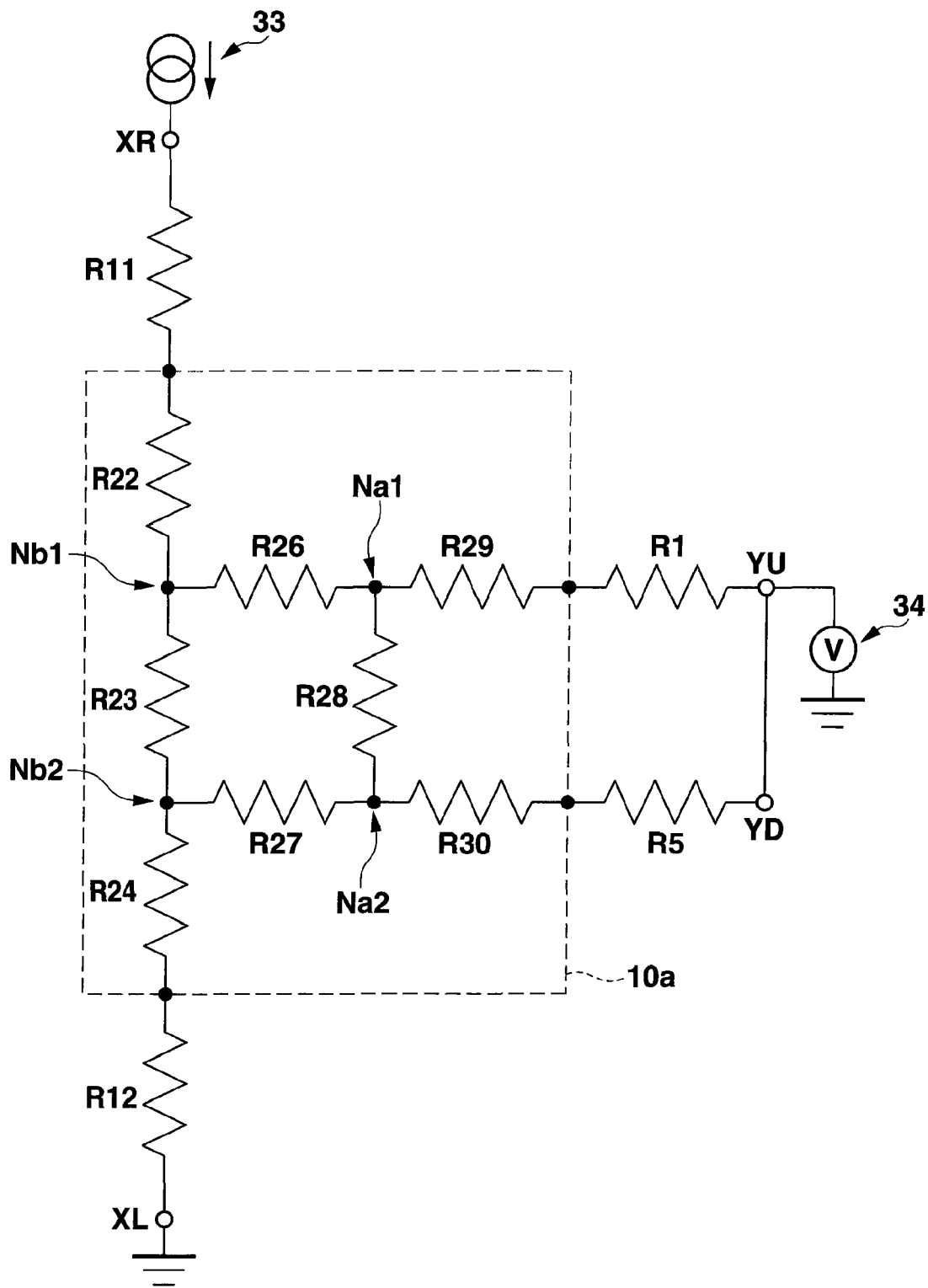
FIG. 22 is an equivalent circuit diagram illustrating a case where two points are touched in the fifth state.

FIG. 22 shows the sixth state when the two points are touched in the touch detection region. 10a as a more detailed equivalent circuit. In FIG. 22, the region surrounded by the broken line corresponds to the touch detection region 10a. That is, the region surrounded by the broken line corresponds to the region in which the first resistive film 13 and the second resistive film 14 are formed.

Resistance R26 indicates a contact resistance between the second side resistance 14 and the first resistive film 13 at one of the two touched points. Further, resistance R27 indicates a contact resistance between the second side resistance 14 and the first resistive film 13 at the other of the two touched points.

The resistance of the first resistive film 13 in the X-direction can be shown as an equivalent circuit in which the resistance is divided into three using the two touched points as boundaries. That is, the resistance of the first resistive film 13 in the X-direction can be shown by being divided into a resistance R22 from one of the two touched points to the right-end electrode 18b, a resistance R24 from the other of the two touched points to the left-end electrode 18a, and a resistance R23 between the two touched points.

The resistance of the second resistive film 14 in the X-direction is referred to as follows: the resistance between the two touched points as R28; the resistance from one of the two touched points closer to the upper-end electrode 19a to the upper-end electrode 19a as R29; and the resistance from one of the two touched points closer to the lower-end electrode 19b to the lower-end electrode 19b as R30.

Since R26 and R27 indicate a contact resistance between the first resistive film 13 and the second resistive film 14, the values indicated by R26 and R27 do not vary depending on the distance between the two touched points. On the other hand, the values indicated by R22, R23, R24, R28, R29 and R30 vary depending on the distance between the two touched points. For example, as the distance between the two touched points increases, the values indicated by R23 and R28 increase, and the values indicated by R22, R24, R29, and R30 decrease. In other words, as the distance between the two touched points decreases, the values indicated by R23 and R28 decrease, and the values indicated by R22, R24, R29, and R30 increase.

Since the constant-current source 33 is used as a power supply in the sixth state, the amount of current that flows into R24 and R12 is constant. Accordingly, a change in potential measured by the potential measuring module 34 will be dominantly contributed by a change in R29 and R30. Therefore, by measuring a change in potential measured by the potential measuring module 34 in the sixth state, a change at R29 and R30, i.e., a change in distance between the two touched points in the Y-direction can be detected.

In this sixth state, when the two points are touched such that a position of a midpoint between the two touched points is (X4, Y4), for example, potentials will be measured as follows. When two points of coordinates (X5, Y1) and (X3, Y7) are simultaneously touched, for example, in which case a potential of 2.9 V is detected in step S2 and a potential of 2.8 V is detected in step S3, a potential of 3.0 V will be detected.

Figures 23, 24:
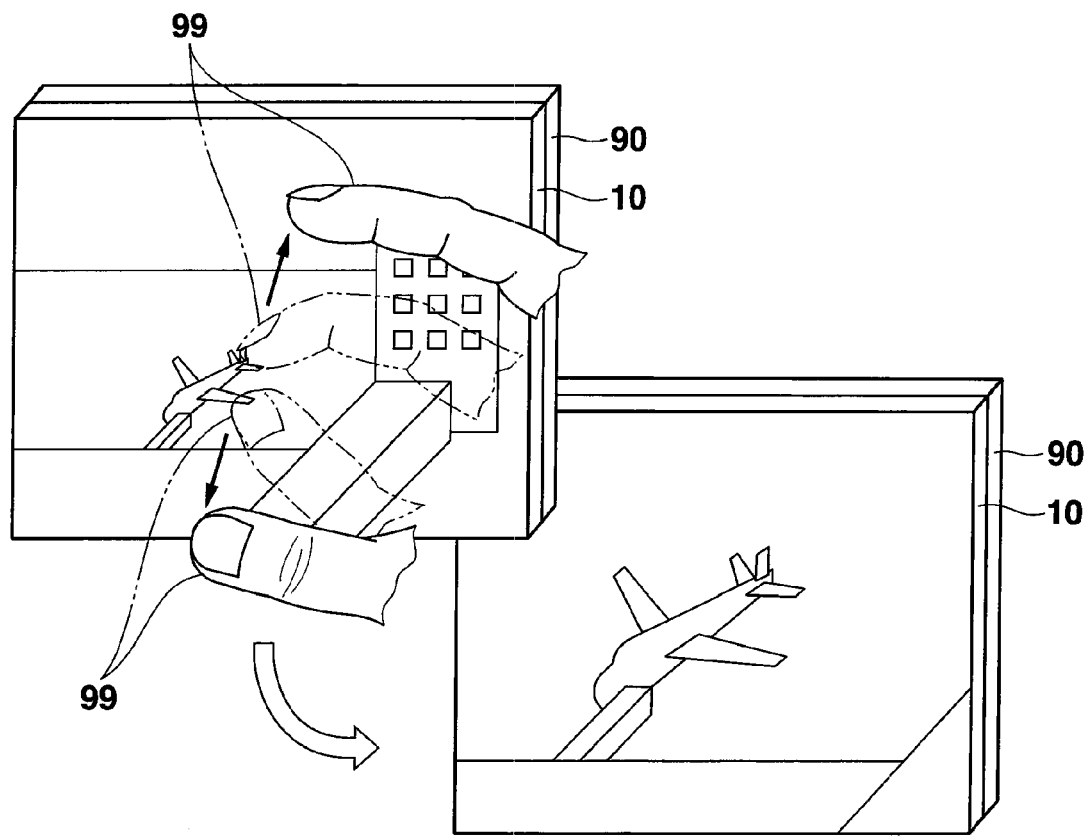
FIG. 23 illustrates an example of potentials that are detected when two points have been touched in the sixth state.
FIG. 24 illustrates an application example of the resistive touch panel device of the present invention.

In this specific example, there are 17 pairs of touch positions by which a potential of 2.9 V is detected in step S2, and a potential of 2.8 V is detected in step S3 when the two points are simultaneously touched. The relationship between the 17 pairs of touched positions and the potentials measured by the potential measuring module 34 is shown in FIG. 23. In FIG. 23, the same value is shown in the two points that are simultaneously touched. For example, FIG. 23 shows that, when coordinates (X2, Y6) and (X6, Y2) are simultaneously touched, a potential of 3.4 V will be detected in step S10. Further, FIG. 23 shows that, when coordinates (X3, Y3) and (X5, Y5) are simultaneously touched, a potential of 3.6 V will be detected in step S10, for example. As shown in FIG. 23, even when a potential of 2.9 V is detected in step S2 and a potential of 2.8 V is detected in step S3, the potential measured by the potential measuring module 34 in step S10 varies depending on the combination of the two points that are simultaneously touched, and in particular, the distance between the two points in the Y-direction.

In step S10, the control module 35 obtains a potential V(Y) measured by the potential measuring module 34 in the above-described sixth state.

In step S11, the control module 35 determines whether Multi is "1" or not. When Multi is not "1", that is, when Multi is "0", the control module 35 shifts the procedure to step S12.

In step S12, the control module 35 substitutes V(X) derived in step S9 into DisX, which is designed to temporarily store V(X).

In step S13, the control module 35 substitutes V(Y) derived in step S10 into DisY, which is designed to temporarily store V(Y).

In step S14, the control module 35 substitutes "1" into Multi, and returns to step S2.

The procedure is shifted from step S11 to step S12 when it is determined in steps S4-S7 in the previous iteration of the iterative process that one point has been touched and that a value is not input to DisX and DisY.

When it is determined in step S11 that Multi indicates "1", the control module 35 shifts the procedure to step S15.

In step S15, the control module 35 substitutes a difference between DisX and V(X) derived in step S9, i.e., (DisX−V(X)) into diffX indicating a change in distance between the two points in the X-direction. That is, the difference between V(X) in the previous iteration of the iterative process and V(X) in the current iteration is substituted into diffX.

In step S16, as in step S15, the control module 35 substitutes a difference between DisY and V(Y) derived in step S10, i.e., (DisY−V(Y)) into diffY indicating a change in distance between the two points in the Y-direction. That is, the difference between V(Y) in the previous iteration of the iterative process and V(Y) in the current process is substituted into diffY.

In step S17, the control module 35 substitutes V(X) derived in step S9 into DisX.

In step S18, the control module 35 substitutes V(Y) derived in step S10 into DisY.

In step S19, the control module 35 substitutes the larger of absolute values of diffX and diffY into Chg. Chg indicates the greater of the change in distance between the two points in the X-direction and the change in distance between the two points in the Y-direction.

In step S20, the control module 35 outputs a signal including information that the touch is a multi-touch and information on the coordinates (X0, Y0) and Chg as a detected value by the touch panel device 2. After that, the control module 35 returns the procedure to step S2.

In this case, the positive value of Chg shows that the distance between the two points that have been simultaneously touched has increased during the period of time from the previous iteration to the current iteration in the iterative process. Conversely, the negative value of Chg shows that the distance between the two points that have been simultaneously touched has decreased during the period of time from the previous iteration to the current iteration in the iterative process. Further, the absolute value of Chg indicates an approximate amount of a change in distance between the two points during the period of time from the previous iteration to the current iteration in the iterative process.

In step S20, the detected value is output to the control device of the electronic device in which the display device 1 is incorporated, for example. The control device that has obtained the detected value is capable of executing a predetermined procedure compliant with multi-touch, determining that two points have been touched on the touch panel, or positions of the two touched points have been changed.

For example, when two points of coordinates (X3, Y5) and (X5, Y3) are touched in the first iteration of the iterative process, two points of coordinates (X3, Y6) and (X5, Y2) are touched in the second iteration, and two points of coordinates (X2, Y7) and (X6, Y1) are touched in the third iteration, a central position of the two points being the coordinates (X4, Y4), at which a potential of 2.9 V is detected in step S2 and a potential of 2.8 V is detected in step S3, the operation will be as described below.

In the first iteration of the iterative process, a potential of 2.5 V is acquired in step S9, and a potential of 3.6 V is acquired in step S10. Since it is determined in step S11 that variable Multi=0, DisX=2.5 is substituted in step S12, and DisY=3.6 is substituted in step S13. In step S14, Multi=1 is substituted.

In the second iteration of the iterative process, a potential of 2.5 V is acquired in step S9 and a potential of 3.4 V is acquired in step S10. Since it is determined in step S11 that Multi=1, diffX=(2.5−2.5)=0 is substituted in step S15, and diffY=(3.6−3.4)=0.2 is substituted in step S16. In step S19, the greater absolute value 0.2 of diffX and diffY is substituted into Chg. In step S20, the coordinates (X4, Y4), which represent the midpoint between the two touched points, and Chg=0.2 are output. The positive value of Chg indicates that the distance between the two points has increased.

In the third iteration of the iterative process, a potential of 2.0 V is acquired in step S9 and a potential of 3.0 V is acquired in step S10. Since it is determined in step S11 that Multi=1, diffX=(2.5−2.0)=0.5 is substituted in step S15, and diffY=(3.4−3.0)=0.4 is substituted in step S16. In step S19, the greater absolute value 0.5 of diffX and diffY is substituted into Chg. In step S20, the coordinates (X4, Y4) of the midpoint between the two touched points and Chg=0.5 are output. The positive value of Chg indicates that the distance between the two points has further increased, compared to the second iteration.

In this way, V(X0) corresponds to the first potential difference, for example, V(Y0) corresponds to the second potential difference, for example, V(S4) corresponds to the third potential, for example, V(S6) corresponds to the fourth potential, for example, V(X) corresponds to the fifth potential, and V(Y) corresponds to the sixth potential.

Based on the above-described detected value of the touch position detected by the touch panel device, an electronic device comprising the touch panel device is capable of setting a configuration, in order to provide enlarged display of an image displayed on the display panel 90 using a specific position as a central position, of touching the touch panel 10 with two fingers 99 interposing the central position in between and moving the two fingers 99 such that the distance between the two fingers 99 increases, for example, as shown in FIG. 24, as well as a configuration of specifying a point in an image displayed on the image display region of the display panel 90 shown in FIG. 1 via the touch panel 10 or scrolling the display image by moving the touched point in an arbitrary direction, for example. Similarly, in order to provide reduced display, a configuration of moving the fingers 99 on the touch panel 10 so as to decrease the distance between the fingers 99 can be similarly set.

Thus, according to the present embodiment, when two points are simultaneously touched, it is possible to detect information on the position of the midpoint between the two points and the distance between the two points, and in particular, information on a change in distance between the two touched points, using a resistive touch panel that can be manufactured at a low cost because of the simple configuration.

[Second Embodiment]

A second embodiment of the present invention will be described below. In the description of the second embodiment, only the configurations different from those of the first embodiment will be described, and structural elements same as those of the first embodiment will be denoted by the same reference numerals and descriptions of such elements will be omitted. According to the first embodiment, by deriving Chg, it is possible to obtain information as to whether the distance between the two points that have been touched simultaneously has increased or decreased, and an approximate amount of change in distance between the two points, during the period of time from the previous iteration to the current iteration in the iterative process. However, V(X) and V(Y) vary depending on the position of the midpoint between the two touched points, even if the distance between the two points remains the same. Accordingly, when the distance between the two points that have been simultaneously touched is derived based on V(X) and V(Y), the error in the obtained value becomes large. This error does not become a problem in the first embodiment when the distance between the two points varies without causing a change in the position of the midpoint between the two points. In the second embodiment, a case will be described where V(X) and V(Y) are corrected according to the position of the midpoint between the two touched points, and the distance between the two touched points is acquired accurately.

Figure 25:
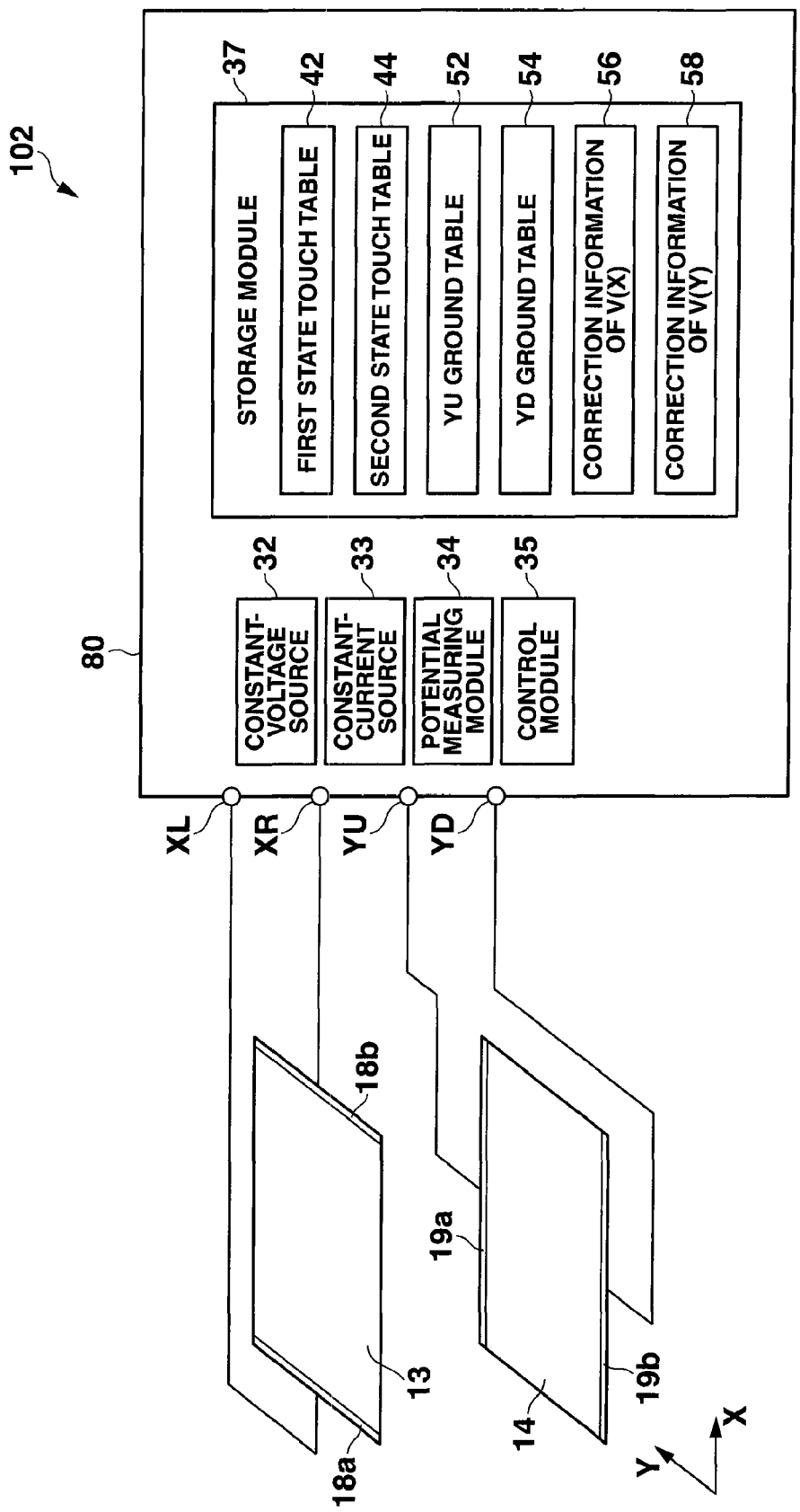
FIG. 25 illustrates an example of an overall configuration of the touch panel device according to a second embodiment.

FIG. 25 shows a touch panel device 102 according to the second embodiment. As shown in FIG. 25, the touch panel device 102 is different from the touch panel device 2 of the first embodiment in that correction information 56 of V(X) and correction information 58 of V(Y) are stored in the storage module 37. In the present embodiment, V(X) and V(Y) are corrected using the correction information 56 of V(X) and the correction information 58 of V(Y). For example, assuming that the corrected value of V(X) is V(X)' and the corrected value of V(Y) is V(Y)', V(X)' and V(Y)' are respectively derived by the following equations (3) and (4):

$$V(X)'=(V(X)-STDX1)/STDX2 \quad (3),$$

$$V(Y)'=(V(Y)-STDY1)/STDY2 \quad (4).$$

It is to be noted that the correction information 56 of V(X) includes a relationship between a position of the midpoint between the two touched points and STDX1 and STDX2, for example, and the correction information 58 of V(Y) includes a relationship between a position of the midpoint between the two touched points and STDY1 and STDY2, for example.

For example, assume that a correction is performed such that the minimum of corrected value V(X)' obtained when two points (e.g., a point in row X2 and a point in row X6) apart from each other by 4 rows in the X-direction are touched becomes 0, and the maximum of corrected value V(X)' obtained when two points approximated each other to the limit of the resolution in the X-direction becomes 10, for example. In this case, STDX1 and STDX2 can be derived in advance as will be described below, for example. As shown in FIG. 20, for example, when the coordinates (X4, Y4) are set as the position of the midpoint between the two points, the minimum value MIN1 obtained when two points apart from each other by 4 rows in the X-direction shown in FIG. 20 are touched will be 1.9 and the maximum value MAX1 obtained when two points approximated each other to the limit of the resolution in the X-direction are touched will be 2.7. Accordingly, since STDX1=MIN1 and STDX2=(MAX1−MIN1)/10, STDX1 and STDX2 are derived as 1.9 and 0.08, respectively. In this way, the relationship between the position of each of the midpoint and STDX1 and STDX2 is acquired in advance, and stored in the storage module 37 as the correction information 56 of V(X).

Similarly, assume that a correction is made such that the minimum of corrected value V(Y)' obtained when two points (e.g., a point in column Y1 and a point in column Y7) apart from each other by 6 columns in the Y-direction are touched becomes 0, and the maximum of corrected value V(Y)' obtained when two points approximated each other to the limit of the resolution in the Y-direction are touched becomes 10, for example. In this case, as shown in FIG. 23, for example, when the point of the coordinates (X4, Y4) is set as the position of a midpoint between the two points, the minimum value MIN2 obtained when two points apart from each other by 6 columns in the Y-direction in FIG. 23 are touched will be 2.9, and the maximum value MAX2 obtained when two points approximated each other to the limit of the resolution of the Y-direction are touched will be 4.2. Accordingly, since STDY1=MIN2 and STDY2=(MAX2−MIN2)/10, STDY1 and STDY2 are derived as 2.9 and 0.13, respectively. In this way, the relationship between the position of each of the midpoint and STDX1 and STDX2 is acquired in advance, and stored in the storage module 37 as the correction information 56 of V(Y).

Figure 26:
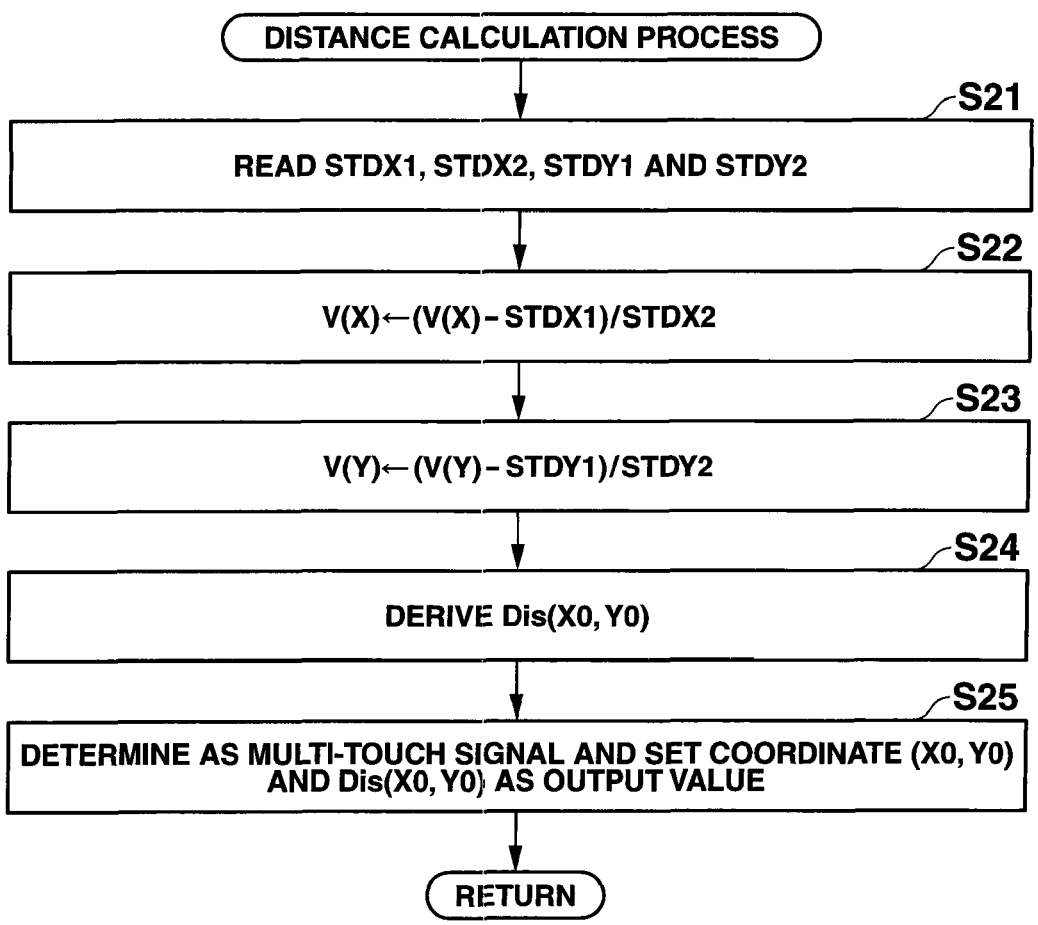
FIG. 26 is a flowchart illustrating a procedure of a distance calculation process.

A position detection method employed by the control module 35 according to the present embodiment will be described. In the present embodiment, a distance calculation process is performed between step S10 and step S11 in the detection method of the first embodiment described with reference to FIG. 5. FIG. 26 is a flowchart illustrating the distance calculation process.

After step S10 of the procedure described with reference to FIG. 5, in step S21, the control module 35 reads STDX1 and STDX2 included in the correction information 56 of V(X) and STDY1 and STDY2 included in the correction information 58 of V(Y) from the storage module 37. The control module 35 reads STDX1, STDX2, STDY1, and STDY2 corresponding to the coordinates (X0, Y0) of the midpoint between the two touched points, which is derived based on V(X0) acquired in step S2 and V(Y0) acquired in step S3.

In step S22, the control module 35 derives a corrected value V(X)' of V(X) based on equation (3), and substitutes V(X)' into V(X).

For example, when the position of the midpoint between the two points is (X4, Y4), STDX1 is 1.9 and STDX2 is 0.08. Based on these values and equation (3), V(X)' is derived by the following equation (5):

$$V(X)'=(V(X)-1.9)/0.08 \quad (5).$$

The control module 35 substitutes the renewed corrected value V(X)' into V(X). As a result thereof, the relationship between the position of the two touched points and V(X) shown in FIG. 20, for example, is corrected, and the relationship between the positions of the two touched points and the renewed V(X) will be as shown in FIG. 27. The renewed V(X) after the correction indicates a distance between the two touched points in the X-direction; the greater V(X) is, the less the distance between the two touched points in the X-direction is.

In step S23, the control module 35 derives the corrected value V(Y)' of V(Y) based on equation (4), and substitutes V(Y)' into V(Y).

For example, when the position of the midpoint between the two points is (X4, Y4), STDY1 is 2.9 and STDX2 is 0.13. Based on these values and equation (4), V(Y)' is derived by the following equation (6):

$$V(Y)'=(V(Y)-2.9)/0.13 \quad (6).$$

The control module 35 substitutes the renewed corrected value V(Y)' into V(Y). As a result, the relationship between the positions of the two touched points and V(Y) shown in FIG. 23, for example, is corrected, and the relationship between the positions of the two touched points and the renewed V(Y) will be as shown in FIG. 28. The new V(Y) after the correction indicates a distance between the two touched points in the Y-direction; the greater V(Y) is, the less the distance between the two touched points in the Y-direction is.

In step S24, the control module 35 derives Dis(X0, Y0) indicating a distance between the two touched points based on the corrected V(X) obtained in step S22 and the corrected V(Y) obtained in step S23 by Pythagoras's theorem, i.e., the following equation (7):

$$Dis(X0,Y0)=(V(X)^2+V(Y)^2)^{1/2} \quad (7)$$

When a potential of 2.9 V is detected in step S2 and a potential of 2.8 V is detected in step S3 in the 17 pairs shown in FIGS. 27 and 28, the relationship between the touched position and the Dis(X0, Y0) indicating the distance between the two points will be as shown in FIG. 29. That is, Dis(X0, Y0) indicates a distance between the two touched points; the greater Dis(X0, Y0) is, the greater the distance between the two touched points is. It is to be noted that the position of the midpoint between the two points that have been simultaneously touched is represented by the coordinates (X0, Y0).

Since Dis(X0, Y0) is derived based on V(X) and V(Y) corrected according to the position of the midpoint between the two points, Dis(X0, Y0) does not depend on the position of the midpoint between the two points and indicates a value proportional to the distance between the two points that have been simultaneously touched, in any position of the touch detection region 10a.

In step S25, the control module 35 outputs a signal including information that the touch is a multi-touch and information as to the coordinates (X0, Y0) and Dis(X0, Y0) as a detected value by the touch panel device 2.

The detected value output in step S25 is input to a control device of an electronic device in which the display device 1 is incorporated, for example. The control device that has acquired the detected value is capable of executing a predetermined procedure compliant with multi-touch, determining that two points have been touched on the touch panel, or according to the value indicating the distance between the two touched points.

After that, the control module 35 ends the distance calculation process, and returns the procedure to step S11 described with reference to FIG. 5. After that, the control module 35 derives a change in distance between the two points that have been simultaneously touched and outputs a result thereof in steps S11-S20, as in the case of the first embodiment. In the second embodiment, a value corrected according to the coordinates (X0, Y0), which represent the midpoint between the two points, is used as V(X) and V(Y). Accordingly, the value indicating a change in distance between the two points obtained by the second embodiment is more accurate than that of the first embodiment.

As described above, according to the second embodiment, it is possible to accurately detect information on distance between the two touched points. In the second embodiment, calculation of a change in distance between the two points and output of the result thereof by the control module 35 in steps S11-S20 may be omitted, if unnecessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the direction of the voltage applied to between terminals XL and XR and terminals YU and YD may be inverted. Alternatively, the terminal to which a voltage is applied by the constant-voltage source 32 may be set between terminals YU and YD, and the combination of the terminal at which the potential is measured by the potential measuring module 34 and the terminal grounded may be set to terminal XL and terminal XR, respectively. Alternatively, in the fifth condition and sixth condition, the terminal to which a current is applied by the constant-current source 33 may be set to terminals XL and YD. In those cases, the procedure can be varied according to the variation in terminal and the table stored in the storage module 37 can be varied.

What is claimed is:

1. A method of detecting a contact state of a resistive touch panel device, the method comprising:
    measuring, in a first state in which (i) a predetermined voltage is applied between a first end region and a second end region and (ii) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end region being an end region of the second resistive film opposite to the third end region;
    measuring, in a second state in which (i) the voltage is applied between the third end region and the fourth end region and (ii) the first end region is made open, a potential at the second end region as a second potential;
    measuring, in a third state in which (i) the first end region and the fourth end region are short-circuited and (ii) the voltage is applied between the first end region and the second end region, a potential at the third end region as a third potential;
    measuring, in a fourth state in which (i) the first end region and the third end region are short-circuited and (ii) the voltage is applied between the first end region and the second end region, a potential at the fourth end region as a fourth potential;
    measuring, in a fifth state in which (i) the first end region and the second end region are short-circuited and (ii) a predetermined current is applied between the third end region and the fourth end region, a potential at the first end region and the second end region as a fifth potential;
    measuring, in a sixth state in which (i) the third end region and the fourth end region are short-circuited and (ii) the current is applied between the first end region and the second end region, a potential at the third end region and the fourth end region as a sixth potential; and
    deriving distance information between two points when the first resistive film contacts the second resistive film at the two points, based on the first potential, the second potential, the third potential, the fourth potential, the fifth potential and the sixth potential.

2. The method according to claim 1, further comprising deriving position information of a midpoint between the two points based on the first potential and the second potential.

3. The method according to claim 1, wherein deriving the distance information between the two points is carried out when a number of contact points between the first resistive film and the second resistive film is determined to be not one.

4. The method according to claim 1, wherein deriving the distance information between the two points includes:
    deriving first distance information between the two points in the first direction based on the first potential, the second potential and the fifth potential, and
    deriving second distance information between the two points in the second direction based on the first potential, the second potential and the sixth potential.

5. The method according to claim 1, wherein the first direction and the second direction are perpendicular to each other.

6. The method according to claim 1, wherein the first resistive film and the second resistive film are arranged so as to face each other.

7. A resistive touch panel device comprising:
a touch panel including
(i) a first resistive film, and
(ii) a second resistive film which faces the first resistive film; and
a driving circuit configured to perform
(i) measuring, in a first state in which (a) a predetermined voltage is applied between a first end region and a second end region and (b) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end region being an end region of the second resistive film opposite to the third end region,
(ii) measuring, in a second state in which (a) the voltage is applied between the third end region and the fourth end region and (b) the first end region is made open, a potential at the second end region as a second potential,
(iii) measuring, in a third state in which (a) the first end region and the fourth end region are short-circuited and (b) the voltage is applied between the first end region and the second end region, a potential at the third end region as a third potential,
(iv) measuring, in a fourth state in which (a) the first end region and the third end region are short-circuited and (b) the voltage is applied between the first end region and the second end region, a potential at the fourth end region as a fourth potential,
(v) measuring, in a fifth state in which (a) the first end region and the second end region are short-circuited and (b) a predetermined current is applied between the third end region and the fourth end region, a potential at the first end region and the second end region as a fifth potential,
(vi) measuring, in a sixth state in which (a) the third end region and the fourth end region are short-circuited and (b) the current is applied between the first end region and the second end region, a potential at the third end region and the fourth end region as a sixth potential, and
(vii) deriving distance information between two points when the first resistive film contacts the second resistive film at the two points, based on the first potential, the second potential, the third potential, the fourth potential, the fifth potential and the sixth potential.

8. The resistive touch panel device according to claim 7, wherein the driving circuit further derives position information of a midpoint between the two points based on the first potential and the second potential.

9. The resistive touch panel device according to claim 7, wherein the driving circuit carries out deriving the distance information between the two points when a number of contact points between the first resistive film and the second resistive film is determined to be not one.

10. The resistive touch panel device according to claim 7, wherein the first direction and the second direction are perpendicular to each other.

11. The resistive touch panel device according to claim 7, wherein the touch panel further includes:
a first substrate, the first resistive film being formed on the first substrate, and
a plurality of projections arranged so as to be interposed between the first substrate and the first resistive film.

12. The resistive touch panel device according to claim 7, wherein deriving the distance information between the two points includes:
deriving first distance information between the two points in the first direction based on the first potential, the second potential and the fifth potential, and
deriving second distance information between the two points in the second direction based on the first potential, the second potential and the sixth potential.

13. A display device comprising:
a display panel which displays an image;
a touch panel including
(i) a first resistive film, and
(ii) a second resistive film which faces the first resistive film; and
a driving circuit configured to perform
(i) measuring, in a first state in which (a) a predetermined voltage is applied between a first end region and a second end region and (b) a third end region is made open, a potential at a fourth end region as a first potential, the first end region being an end region of a first resistive film, as viewed in a first direction, the second end region being an end region of the first resistive film opposite to the first end region, the third end region being an end region of a second resistive film, as viewed in a second direction which intersects the first direction, and the fourth end on being an end region of the second resistive film opposite to the third end region,
(ii) measuring, in a second state in which (a) the voltage is applied between the third end region and the fourth end region and (b) the first end region is made open, a potential at the second end region as a second potential,
(iii) measuring, in a third state in which (a) the first end region and the fourth end region are short-circuited and (b) the voltage is applied between the first end region and the second end region, a potential at the third end region as a third potential,
(iv) measuring, in a fourth state in which (a) the first end region and the third end region are short-circuited and (b) the voltage is applied between the first end region and the second end region, a potential at the fourth end region as a fourth potential,
(v) measuring, in a fifth state in which (a) the first end region and the second end region are short-circuited and (b) a predetermined current is applied between the third end region and the fourth end region, a potential at the first end region and the second end region as a fifth potential,
(vi) measuring, in a sixth state in which (a) the third end region and the fourth end region are short-circuited and (b) the current is applied between the first end region and the second end region, a potential at the third end region and the fourth end region as a sixth potential, and
(vii) deriving distance information between two points when the first resistive film contacts the second resistive film at the two points, based on the first potential, the second potential, the third potential, the fourth potential, the fifth potential and the sixth potential.

14. The display device according to claim 13, wherein the display panel is arranged such that an image display region of the display panel faces a touch detection region of the touch panel.

* * * * *

UNITED STATES PATENT AND TRADEMARK OFFICE
CERTIFICATE OF CORRECTION

| | | |
|---|---|---|
| PATENT NO. | : 8,842,092 B2 | Page 1 of 1 |
| APPLICATION NO. | : 13/094042 | |
| DATED | : September 23, 2014 | |
| INVENTOR(S) | : Masanori Sakamoto | |

It is certified that error appears in the above-identified patent and that said Letters Patent is hereby corrected as shown below:

In the Claims

Column 26, Claim 13, Line 28, delete "on" and insert --region--.

Signed and Sealed this
Seventeenth Day of March, 2015

Michelle K. Lee
*Director of the United States Patent and Trademark Office*